US011113125B2

(12) United States Patent
Misumi et al.

(10) Patent No.: US 11,113,125 B2
(45) Date of Patent: Sep. 7, 2021

(54) CONTROL DEVICE, SENSOR MANAGEMENT DEVICE, CONTROL METHOD, SENSOR MANAGEMENT METHOD AND PROGRAM

(71) Applicant: OMRON Corporation, Kyoto (JP)

(72) Inventors: Shuichi Misumi, Kyoto (JP); Toshihiko Oda, Kusatsu (JP); Tetsuji Yamato, Yokohama (JP); Ryota Yamada, Tokyo (JP)

(73) Assignee: OMRON Corporation, Kyoto (JP)

( * ) Notice: Subject to any disclaimer, the term of this patent is extended or adjusted under 35 U.S.C. 154(b) by 26 days.

(21) Appl. No.: 16/347,827

(22) PCT Filed: Oct. 25, 2017

(86) PCT No.: PCT/JP2017/038425
§ 371 (c)(1),
(2) Date: May 7, 2019

(87) PCT Pub. No.: WO2018/110095
PCT Pub. Date: Jun. 21, 2018

(65) Prior Publication Data
US 2019/0317839 A1    Oct. 17, 2019

(30) Foreign Application Priority Data
Dec. 15, 2016    (JP) .............................. JP2016-243661

(51) Int. Cl.
*G06F 9/54*    (2006.01)
*H04Q 9/00*    (2006.01)

(52) U.S. Cl.
CPC ............... *G06F 9/542* (2013.01); *H04Q 9/00* (2013.01)

(58) Field of Classification Search
None
See application file for complete search history.

(56) References Cited

U.S. PATENT DOCUMENTS

| 2012/0124594 A1 | 5/2012 | Mikami |
| 2013/0219414 A1 | 8/2013 | Sato |

(Continued)

FOREIGN PATENT DOCUMENTS

| EP | 2801962 A1 | 11/2014 |
| JP | 5445722 B1 | 3/2014 |

(Continued)

OTHER PUBLICATIONS

Yutaka Hirota et al., "Design and Implementation of Real World Oriented Metadata Management System MeT for Semantic Sensor Network", The IEICE Transactions on Fundamentals of Electronics, Communications and Computer Sciences, Dec. 1, 2006, pp. 1090-1103, vol. J89-A, No. 12, Relevance is indicated in the (translated) ISR/WO mailed on Nov. 28, 2017.

(Continued)

*Primary Examiner* — Charles E Anya
(74) *Attorney, Agent, or Firm* — Metrolex IP Law Group, PLLC

(57) ABSTRACT

A communication unit acquires sensor-side metadata, which is information relating to a sensor, and application-side metadata, which is information relating to an application. A comparison unit extracts a sensor that can provide the sensing data through matching between the sensor-side metadata and the application-side metadata, and a notification unit transmits, based on a result of the extraction, a data flow control command to a sensor management device. The sensor-side metadata and the application-side metadata contain data that can be handled as dynamic data.

20 Claims, 12 Drawing Sheets

(56) References Cited

U.S. PATENT DOCUMENTS

| | | | | |
|---|---|---|---|---|
| 2014/0372561 | A1* | 12/2014 | Hisano | G08G 1/0112 |
| | | | | 709/217 |
| 2015/0006548 | A1 | 1/2015 | Huang et al. | |
| 2015/0245212 | A1* | 8/2015 | Kawamura | H04W 12/0804 |
| | | | | 455/410 |
| 2016/0210862 | A1 | 7/2016 | Hisano | |

FOREIGN PATENT DOCUMENTS

| | | | | |
|---|---|---|---|---|
| JP | 2015226102 | * | 5/2014 | H04Q 9/00 |
| JP | 2015-226102 A | | 12/2015 | |
| WO | 2011/010711 A1 | | 1/2011 | |
| WO | 2012/060465 A1 | | 5/2012 | |

OTHER PUBLICATIONS

An English translation of the International Search Report of PCT/JP2017/038425 dated Nov. 28, 2017.
The Written Opinion of PCT/JP2017/038425 dated Nov. 28, 2017.
The extended European search report (EESR) dated Nov. 28, 2019 in a counterpart European patent application.

\* cited by examiner

FIG. 8

Sensor-side metadata

| Category | Sightseeing, mobile type |
|---|---|
| Data delivery entity | Bus business operator A |
| Measurement object name | Area B, bus route C, bus numbers X, Y, Z |
| Measurement item | Still view image, real-time positional coordinates of the bus, time |
| Data usage range | Non-commercial use, virtual sightseeing, urban area state recognition |
| What can be handled as dynamic metadata | Real-time positional coordinates of the bus, time |
| Dynamic component details | |
|     Measurement location | Mobile type, detailed operation schedule URL |
|     Measurement time | Interval of one second |

FIG. 9

Application-side metadata

| Category | Sightseeing, mobile type |
|---|---|
| Data delivery entity | Bus business operator A |
| Measurement object name | Area B, bus route C, bus numbers X, Y, Z |
| Measurement item | Still view image |
| Data usage range | Virtual sightseeing |
| Dynamic component details | |
|     Condition for measurement location | Positional coordinates are within a radius of 20 m from Nijo-jo Castle |
|     Condition for measurement time | First passing timing after 9:45 |

FIG. 10

Sensor-side metadata

| Category | Weather |
|---|---|
| Data delivery entity | Meteorological Agency |
| Measurement object name | Sensor ○○ in ○○ city in ○○ prefecture |
| Measurement location | ○○ city in ○○ prefecture |
| Measurement item | Temperature, time |
| Data usage range | Research |
| Data that can be handled as dynamic metadata | Temperature, time |
| Dynamic component detail | |
|     Measurement time | Interval of one minute |

( a )

Application-side metadata

| Category | Weather |
|---|---|
| Data delivery entity | Meteorological Agency |
| Measurement object name | Sensor ○○ in ○○ city in ○○ prefecture |
| Measurement location | ○○ city in ○○ prefecture |
| Measurement item | Temperature, time |
| Data usage range | Global warming research |
| Dynamic component detail | |
|     Condition for measurement | Temperature is 30 degrees or higher, temperature, time |

Sensor-side metadata

| Category | Electric power |
|---|---|
| Data delivery entity | Power generation business operator B of solar cells |
| Measurement object name | Solar cell △△ in △△ city in △△ prefecture |
| Measurement location | △△ city in △△ prefecture |
| Measurement item | Electric power, time |
| Data usage range | Research |
| Data that can be handled as dynamic metadata | Electric power, time |
| Dynamic component detail | |
|     Measurement time | Interval of one second |

( a )

Application-side metadata

| Category | Electric power |
|---|---|
| Data delivery entity | Power generation business operator B of solar cells |
| Measurement object name | Solar cell △△ in △△ city in △△ prefecture |
| Measurement location | △△ city in △△ prefecture |
| Measurement item | Electric power, time |
| Data usage range | Global warming research |
| Dynamic component detail | |
|     Condition for measurement | Production of electricity being 1W or greater, electric power, time |

Sensor-side metadata

| Category | Crime prevention |
|---|---|
| Data delivery entity | Owner C of a security camera in a park |
| Measurement object name | Camera ▫▫ in the park in ▫▫ town in ▫▫ city in ▫▫ prefecture |
| Measurement location | ▫▫ town in ▫▫ city in ▫▫ prefecture |
| Measurement item | Image, time |
| Data usage range | Crime prevention |
| Data that can be handled as dynamic metadata | Image, time |
| Dynamic component detail | |
|    Measurement time | Interval of 0.1 seconds |

( a )

Application-side metadata

| Category | Crime prevention |
|---|---|
| Data delivery entity | Owner C of a security camera in a park |
| Measurement object name | Camera ▫▫ in the park in ▫▫ town in ▫▫ city in ▫▫ prefecture |
| Measurement location | ▫▫ town in ▫▫ city in ▫▫ prefecture |
| Measurement item | Image, time |
| Data usage range | Crime prevention |
| Dynamic component detail | |
|    Condition for measurement | When a suspicious individual appears on an image captured by the security camera, image, time |

Sensor-side metadata

| Category | Sightseeing, mobile type |
|---|---|
| Data delivery entity | Bus business operator A |
| Measurement object name | Area B, bus route C, bus numbers X, Y, Z |
| Measurement item | Still view image, real-time positional coordinates of the bus, time |
| Data usage range | Non-commercial use, virtual sightseeing, urban area state recognition |
| What can be handled as dynamic metadata | Real-time positional coordinates of the bus, time |
| Dynamic component details | |
|     Measurement location | Mobile type, detailed operation schedule URL |
|     Measurement time | Interval of one second |

(a)

Sensor-side metadata

| Category | Sightseeing, mobile type |
|---|---|
| Data delivery entity | Bus business operator B |
| Measurement object name | Area B, bus route D, bus numbers α, β, γ |
| Measurement item | Still view image, real-time positional coordinates of the bus, time |
| Data usage range | Non-commercial use, virtual sightseeing, urban area state recognition |
| What can be handled as dynamic metadata | Real-time positional coordinates of the bus, time |
| Dynamic component details | |
|     Measurement location | Mobile type, detailed operation schedule URL |
|     Measurement time | Interval of one second |

(b)

Sensor-side metadata

| Category | Sightseeing, mobile type |
|---|---|
| Data delivery entity | Bus business operator C |
| Measurement object name | Area B, bus route E, bus numbers 1, 2, 3 |
| Measurement item | Still view image, real-time positional coordinates of the bus, time |
| Data usage range | Non-commercial use, virtual sightseeing, urban area state recognition |
| What can be handled as dynamic metadata | Real-time positional coordinates of the bus, time |
| Dynamic component details | |
|     Measurement location | Mobile type, detailed operation schedule URL |
|     Measurement time | Interval of one second |

(c)

CONTROL DEVICE, SENSOR MANAGEMENT DEVICE, CONTROL METHOD, SENSOR MANAGEMENT METHOD AND PROGRAM

TECHNICAL FIELD

The present invention relates to a service for providing sensing data collected by a sensor device or the like, and particularly relates to a control device, a sensor management device, a control method, a sensor management method, and a program.

BACKGROUND ART

Services for providing sensing data collected by a sensor device or the like have gained attention in recent years. Patent Literature 1 discloses a technique for delivering sensing data collected by a sensor from an appropriate provider to an appropriate user. In the technique disclosed in Patent Literature 1, matching is executed between sensor-related information and information relating to an application that uses sensing data, and a sensor is specified that can provide the sensing data required by the application. Then, the sensing data collected by the specified sensor is transmitted to the application. Accordingly, with the technique disclosed in Patent Literature 1, it is possible to deliver sensing data collected by a sensor to a user who requires this sensing data.

CITATION LIST

Patent Literature

Patent Literature 1: JP 5445722B

SUMMARY OF INVENTION

Technical Problem

If services for delivering sensing data become widespread, sensing data provided by a larger number of providers needs to be able to be provided to a larger number of users. In this case, it is conceivable that, if an attempt is made to realize real-time matching, the processing load of the matching increases. For example, in the technique disclosed in Patent Literature 1, when matching for a sensor installed in a mobile object is attempted, the mobile object moves from moment to moment, and thus the matching needs to be performed constantly in order to perform correct matching of the position of metadata. In order to utilize hardware properties, a reduction in such a processing load for performing matching is desirable. As a result of reducing the load of processing for performing matching, it is expected that a sensor that can provide required sensing data can be easily specified, and delivery of the sensing data is facilitated.

In view of the aforementioned circumstances, it is an object of the present invention to provide a control device, a sensor management device, a control method, a sensor management method, and a program that can reduce the load of processing for performing matching between sensor-related information and information relating to an application that uses sensing data.

Solution to Problem

A control device according to one embodiment of the present invention includes: a first acquiring unit configured to acquire sensor-side metadata, which is information relating to a sensor that can output sensing data; a second acquiring unit configured to acquire application-side metadata, which is information relating to an application that uses the sensing data; a comparison unit configured to execute matching between the sensor-side metadata and the application-side metadata, and extract a sensor that can provide sensing data that meets a request of the application; and an instruction unit configured to transmit, to a sensor management device that manages the sensor, a data flow control command that includes information that can specify the sensor extracted by the comparison unit, and the application; wherein the sensor-side metadata contains information that designates part of the metadata as being able to be handled as dynamic data, the application-side metadata contains a condition that part of the metadata is required to be handled as dynamic data, and a dynamic handling condition, and the data flow control command includes the dynamic handling condition, and includes an instruction to instruct, if the sensing data that can be handled as dynamic data and is output by the sensor or data that can be handled as dynamic data and is output by another sensor attached to this sensor satisfies the dynamic handling condition, the corresponding sensor to transmit the sensing data to the application.

According to the control device having the above-described configuration, it is possible to reduce the load of processing for performing matching between information relating to a sensor and information relating to an application that uses sensing data.

The control device according to one embodiment of the present invention may be such that the comparison unit executes matching between a static component contained in the sensor-side metadata and the application-side metadata, and extracts the sensor that can provide the sensing data that meets the request of the application, and the instruction unit transmits, to the sensor management device, a data flow control command that includes a dynamic component of the sensor-side metadata that can be used to determine whether or not the sensing data satisfies the handling condition.

According to the control device having the above-described configuration, it is possible to determine whether or not the sensing data is to be transmitted to the application, by using a dynamic component of the sensor-side metadata that can be used to determine whether or not the sensing data satisfies the handling condition, and flexibly set the condition as to whether or not the sensing data is to be transmitted, thus facilitating use of the sensing data.

The control device according to one embodiment of the present invention may be such that the comparison unit extracts a plurality of candidates for the sensor that can provide the sensing data that meets the request of the application, and the data flow control command includes an instruction to instruct any of the plurality of candidates to transmit the sensing data that satisfies the handling condition to the application.

According to the control device having the above-described configuration, it is possible to determine, from among a plurality of sensors, a sensor that can provide sensing data that meets a request of the application.

The control device according to one embodiment of the present invention may be such that, if the application-side metadata matches a plurality of pieces of sensor-side metadata, the instruction unit transmits the data flow control command to a plurality of sensor management devices that correspond to the respective pieces of sensor-side metadata.

According to the control device having the above-described configuration, it is possible to request the sensors that can transmit sensing data to provide sensing data that meets a request of the application, thus making it possible to increase the likelihood that the sensing data is provided.

The control device according to one embodiment of the present invention may be such that, if the sensor managed by one of the plurality of sensor management devices transmits the sensing data, the instruction unit notifies the remaining at least one sensor management device of cancellation of the instruction to deliver the sensing data.

According to the control device having the above-described configuration, if at least one sensor transmits sensing data, the sensing data can be prevented from being redundantly transmitted from another sensor.

The control device according to one embodiment of the present invention may be such that the metadata contains a measurement item of the sensor that is handled as dynamic data.

According to the control device having the above-described configuration, sensing data can be provided based on a measurement item of the sensor, and the condition as to whether or not the sensing data is to be transmitted can be flexibly set, thus facilitating use of the sensing data.

A sensor management device according to one embodiment of the present invention includes: a receiving unit configured to receive sensing data output by a sensor; and a transmitting unit capable of transmitting the received sensing data to an application that uses the sensing data, wherein the receiving unit receives a data flow control command that includes information that can specify the application and the sensor that is extracted through matching between sensor-side metadata, which is information relating to a sensor that can output the sensing data, and application-side metadata, which is information relating to an application that uses the sensing data, the sensor-side metadata contains information that designates part of the metadata as being able to be handled as dynamic data, the application-side metadata contains a condition that part of the metadata is required to be handled as dynamic data, and a dynamic handling condition, the data flow control command includes the dynamic handling condition, and if the sensing data that can be handled as dynamic data and is output by the sensor or data that can be handled as dynamic data and is output by another sensor attached to this sensor satisfies the dynamic handling condition, the transmitting unit transmits the sensing data to the application.

According to the sensor management device having the above-described configuration, it is possible to reduce the load of processing for performing matching between information relating to a sensor and information relating to an application that uses sensing data.

The sensor management device according to one embodiment of the present invention may be such that the receiving unit is capable of receiving sensing data output by a plurality of sensors, the transmitting unit transmits, out of the sensing data that can be handled as dynamic data and is output by the sensors and the data that can be handled as dynamic data and is output by the other sensors attached to these sensors, sensing data that satisfies the dynamic handling condition to the application.

According to the sensor management device having the above-described configuration, it is possible to determine, from among a plurality of sensors, a sensor that can provide sensing data that meets a request of the application.

The sensor management device according to one embodiment of the present invention may further include a storage unit configured to store the sensing data received by the receiving unit, the sensing data being the sensing data that can be handled as dynamic data and is output by the sensor, or the data that can be handled as dynamic data and is output by the other sensor attached to this sensor, wherein the transmitting unit transmits the sensing data that satisfies the dynamic handling condition to the application, with reference to the storage unit.

According to the sensor management device having the above-described configuration, it is possible to temporarily store sensing data output from a sensor or data output from another sensor, and provide sensing data that meets a request of the application, based on previous data.

The sensor management device according to one embodiment of the present invention may further include a detection unit configured to detect that the sensing data received by the receiving unit satisfies the dynamic handling condition, the sensing data being the sensing data that can be handled as dynamic data and is output by the sensor, or the data that can be handled as dynamic data and is output by the other sensor attached to this sensor, wherein, if it is detected by the detection unit that the dynamic handling condition is satisfied, the transmitting unit transmits the sensing data that satisfies the dynamic handling condition to the application.

According to the sensor management device having the above-described configuration, it is possible to reduce the load of processing for performing matching between information relating to a sensor and information relating to an application that uses sensing data.

The sensor management device according to one embodiment of the present invention may be such that, if the sensing data that satisfies the dynamic handling condition is transmitted to the application, the transmitting unit notifies a control device that transmitted the data flow control command of the transmission of the sensing data.

According to the sensor management device having the above-described configuration, if at least one sensor transmits sensing data, the sensing data can be prevented from being redundantly transmitted from another sensor.

A control method according to one embodiment of the present invention includes: a first acquiring step of acquiring sensor-side metadata, which is information relating to a sensor that can output sensing data; a second acquiring step of acquiring application-side metadata, which is information relating to an application that uses the sensing data; a comparing step of executing matching between the sensor-side metadata and the application-side metadata, and extracting a sensor that can provide sensing data that meets a request of the application; and an instructing step of transmitting, to a sensor management device that manages the sensor, a data flow control command that includes information that can specify the sensor extracted by the comparison unit, and the application, wherein the sensor-side metadata contains information that designates part of the metadata as being able to be handled as dynamic data, the application-side metadata contains a condition that part of the metadata is required to be handled as dynamic data, and a dynamic handling condition, the data flow control command includes the dynamic handling condition, and includes an instruction to instruct, if the sensing data that can be handled as dynamic data and is output by the sensor or data that can be handled as dynamic data and is output by another sensor attached to this sensor satisfies the dynamic handling condition, the corresponding sensor to transmit the sensing data to the application.

According to the control method having the above-described configuration, it is possible to reduce the load of processing for performing matching between information relating to a sensor and information relating to an application that uses sensing data.

A program according to one embodiment of the present invention causes a computer to execute: a first acquiring step of acquiring sensor-side metadata, which is information relating to a sensor that can output sensing data; a second acquiring step of acquiring application-side metadata, which is information relating to an application that uses the sensing data; a comparing step of executing matching between the sensor-side metadata and the application-side metadata, and extracting a sensor that can provide sensing data that meets a request of the application; and an instructing step of transmitting, to a sensor management device that manages the sensor, a data flow control command that includes information that can specify the sensor extracted by the comparison unit, and the application, wherein the sensor-side metadata contains information that designates part of the metadata as being able to be handled as dynamic data, the application-side metadata contains a condition that part of the metadata is required to be handled as dynamic data, and a dynamic handling condition, the data flow control command includes the dynamic handling condition, and includes an instruction to instruct, if the sensing data that can be handled as dynamic data and is output by the sensor or data that can be handled as dynamic data and is output by another sensor attached to this sensor satisfies the dynamic handling condition, the corresponding sensor to transmit the sensing data to the application.

According to the program having the above-described configuration, it is possible to reduce the load of processing for performing matching between information relating to a sensor and information relating to an application that uses sensing data.

A sensor management method according to one embodiment of the present invention includes: a receiving step of receiving sensing data output by a sensor; and a transmitting step capable of transmitting the received sensing data to an application that uses the sensing data, wherein, in the receiving step, a data flow control command is received, the data flow control command including information that can specify the application and the sensor that is extracted through matching between sensor-side metadata, which is information relating to a sensor that can output the sensing data, and application-side metadata, which is information relating to an application that uses the sensing data, the sensor-side metadata contains information that designates part of the metadata as being able to be handled as dynamic data, the application-side metadata contains a condition that part of the metadata is required to be handled as dynamic data, and a dynamic handling condition, the data flow control command includes the dynamic handling condition, and in the transmitting step, if the sensing data that can be handled as dynamic data and is output by the sensor or data that can be handled as dynamic data and is output by another sensor attached to this sensor satisfies the dynamic handling condition, the sensing data is transmitted to the application.

According to the sensor management method having the above-described configuration, it is possible to reduce the load of processing for performing matching between information relating to a sensor and information relating to an application that uses sensing data.

A program according to one embodiment of the present invention causes a computer to execute: a receiving step of receiving sensing data output by a sensor; and a transmitting step capable of transmitting the received sensing data to an application that uses the sensing data, wherein, in the receiving step, a data flow control command is received, the data flow control command including information that can specify the application and the sensor that is extracted through matching between sensor-side metadata, which is information relating to a sensor that can output the sensing data, and application-side metadata, which is information relating to an application that uses the sensing data, the sensor-side metadata contains information that designates part of the metadata as being able to be handled as dynamic data, the application-side metadata contains a condition that part of the metadata is required to be handled as dynamic data, and a dynamic handling condition, the data flow control command includes the dynamic handling condition, and in the transmitting step, if the sensing data that can be handled as dynamic data and is output by the sensor or data that can be handled as dynamic data and is output by another sensor attached to this sensor satisfies the dynamic handling condition, the sensing data is transmitted to the application.

According to the program having the above-described configuration, it is possible to reduce the load of processing for performing matching between information relating to a sensor and information relating to an application that uses sensing data.

Advantageous Effects of Invention

According to the control device, the sensor management device, the control method, the sensor management method, and the program of the present invention, it is possible to reduce the load of processing for performing matching between information relating to a sensor and information relating to an application that uses sensing data.

BRIEF DESCRIPTION OF DRAWINGS

FIG. 8 is a diagram illustrating an example of a configuration of sensor-side metadata according to the working example 1 of the first embodiment of the present invention.

FIG. 9 is a diagram illustrating an example of a configuration of application-side metadata according to the working example 1 of the first embodiment of the present invention.

FIG. 10 illustrate examples of configurations of sensor-side metadata and application-side metadata, according to a working example 2 of the first embodiment of the present invention.

FIG. 11 illustrate other examples of the configurations of sensor-side metadata and application-side metadata, according to the working example 2 of the first embodiment of the present invention.

FIG. 12 illustrate yet other examples of the configurations of sensor-side metadata and application-side metadata, according to the working example 2 of the first embodiment of the present invention.

FIG. 15 illustrate examples of configurations of sensor-side metadata according to the second embodiment of the present invention.

DESCRIPTION OF EMBODIMENTS

First Embodiment

A first embodiment of the present invention will be described with reference to the drawings.

Figure 1:
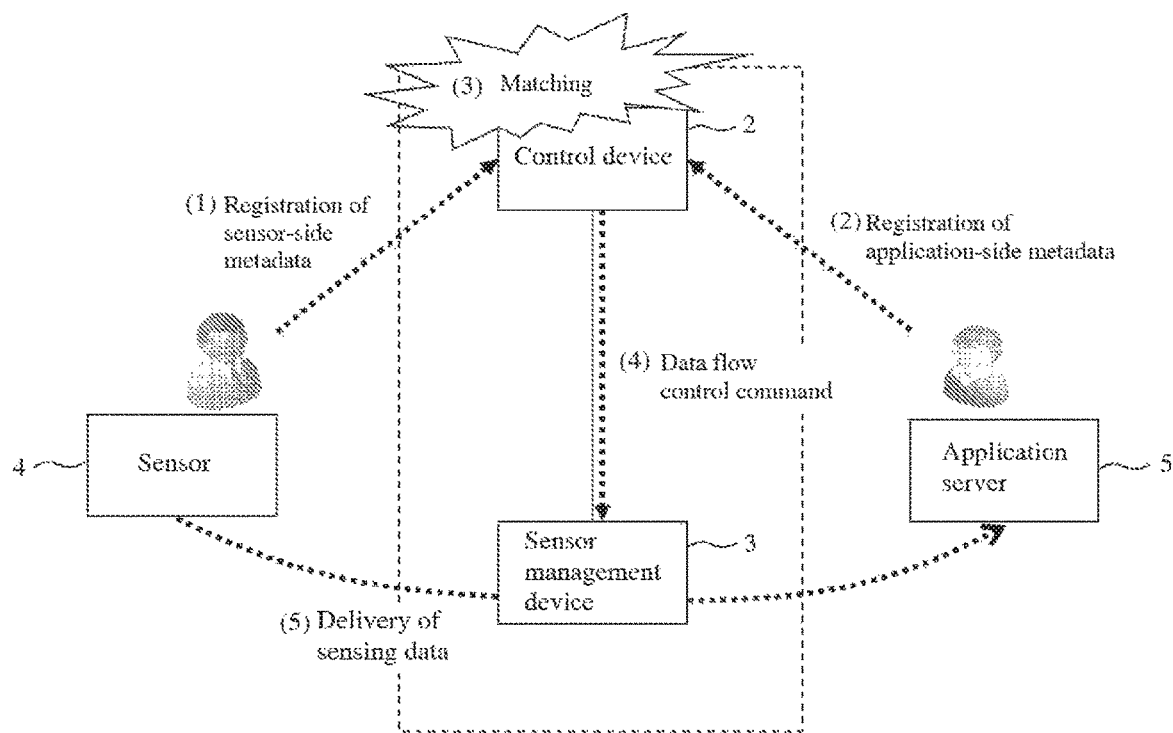
FIG. 1 is a diagram schematically illustrating a data providing system 1 according to a first embodiment of the present invention.

FIG. 1 is a diagram showing an overview of a data providing system 1 according to the first embodiment of the present invention. As shown in FIG. 1, the data providing system 1 can provide a service for mediating between a data provider that provides data, and a data user who uses the data.

The data providing system 1 performs matching between sensing data that is provided by a data provider and sensing data that is desired to be used by the data user, and delivers, if matching therebetween is successful, the sensing data provided by the data provider to the data user.

First, the data providing system 1 receives, from a data provider, (1) registration of "sensor-side metadata" that indicates the content of sensing data that can be provided by the data provider. Note that the number of data providers is not limited to one, and there may be a plurality of data providers. Then, the data providing system 1 receives, from a data user, (2) registration of "application-side metadata" that indicates the content of sensing data that is desired to be used by the data user. Note that the data user uses the sensing data in an application server, for example.

Then, the data providing system 1 executes (3) matching between the registered sensor-side metadata and the registered application-side metadata, and determines whether or not there is sensing data that meets a request of the data user. Then, the data providing system 1 causes a control device 2 to give (4) a "data flow control command", which is information relating to sensing data delivery, to a device that manages a sensor. Then, based on the "data flow control command", the data providing system 1 performs (5) delivery of the sensing data provided by the data provider to the data user.

Here, the data flow control command includes information that specifies a sensor, serving as a data source from which data is provided, and an application, serving as a data destination at which the data is used, and is command information for instructing data delivery from the data source to the data destination. The present invention is characterized in that the data flow control command further includes a later-described event condition.

As described above, the data providing system 1 provides a service for performing matching between sensing data that is provided by a data provider and sensing data that is desired to be used by a data user, and delivering the sensing data based on a result thereof. Accordingly, the data user can easily specify, from among a large number of data providers, a data provider that can provide the sensing data that meets his or her request. Furthermore, the data providing system 1 can also reduce time taken and the effort made by the data provider to search for a data user who desires to use the sensing data provided by the data provider. In this way, the data providing system 1 can facilitate use of sensing data.

Here, "metadata" used in matching refers to attribute information of sensing data. For example, "metadata" is data to be registered by a data provider or a data user, such as a data item, a format specification, and a money charging specification of sensing data. "Metadata" includes data necessary for a user to make a determination regarding a data purchasing contract.

Metadata may also include items such as "who", "what", "where", "when", "how", and "how much". "Who" means a data provider, and is information relating to a given business operator or person. "What" is information relating to a category, a measurement object, and an attribute of the measurement object of sensing data, and the like. "Where" is information indicating a position or a location where measurement was performed. The information encompasses mobile-type information and fixed-type information, and in the mobile-type information, a measurement position changes with spatial movement of a sensing device, whereas in the fixed-type information, a measurement position is fixed and does not change.

Furthermore, "when" is information relating to time at which measurement was performed. The information encompasses instantaneous information and periodic information, and in the instantaneous information, a data value (of speed, for example) is determined by a one-time measurement, whereas in the periodic information, a data value (of electric power, for example) is determined by a measurement taken in a predetermined time period. Furthermore, "how" is information relating to a sensing device (sensor), such as a sensing device specification, a format specification, measurement conditions, and setting conditions. Furthermore, "how much" is information relating to conditions when money is charged, such as a settlement method, a charging method, and the amount of money.

In the data providing system 1, the data provider releases, to the public, at least some of the information of sensing data that the data provider can provide, so that a user can reference them. Also, the data user designates at least some of this information, and specifies the sensing data that he or she desires to use.

Here, in the first embodiment of the present invention, "metadata" may also be sensing data itself. In this case, "metadata" may also be data (event data) of the sensing data that changes every time a measurement is made. For example, "metadata" may also be "temperature", which is sensing data in the case of a thermometer. In this case, for example, the sensor-side metadata contains an item "temperature" that changes from moment to moment, and in the application-side metadata, an "event condition" such as for example "30 degrees or higher", can be set.

The data providing system 1 uses the event data (temperature) of the sensing data to be delivered from the sensor to determine whether or not it satisfies the "event condition" (30 degrees or higher). If the event data satisfies the event condition, the sensing data will be delivered from the data provider to the data user, and otherwise, no sensing data will be delivered.

As described above, the first embodiment of the present invention is an embodiment in which sensor-side metadata contains "event data", and application-side metadata contains an "event condition". The data providing system 1 according to the first embodiment of the present invention references the "event data" of the sensing data, determines whether or not it satisfies the "event condition", and controls whether or not the sensing data needs to be delivered.

However, when sensor-side metadata contains "event data" and application-side metadata contains an "event condition", there is a risk that, if the control device 2 shown in FIG. 1 executes matching, the processing load on the control device 2 may drastically increase. This is because, every time the "event data" of the sensor-side metadata is updated, the control device 2 has to receive (1) registration of the updated sensor-side metadata, execute (3) matching between the registered sensor-side metadata and the application-side metadata, and determine whether or not there is sensing data that satisfies a request of the data user. For example, if the "event data" of the sensor-side metadata is, for example, temperature or electric power that is measured at an interval of one second or the like, matching will need to be executed every second, thus resulting in an increase in the processing load on the control device 2.

Also, the control device 2 needs to execute matching between sensor-side metadata and application-side metadata for a plurality of pairs, rather than only needing to execute matching for one pair. Accordingly, there is a risk that the control device 2 will need to execute, at the same time, multiple matching operations at a short interval, and in this case, the processing load will drastically increase.

Accordingly, in the first embodiment of the present invention, the control device 2 performs, in advance, matching based on static information contained in the sensor-side metadata and the application-side metadata, and then the sensor management device 3 determines whether or not the "event data" satisfies the "event condition", and judges whether or not the sensing data needs to be delivered.

In this way, the processing load required for matching can be dispersed between the control device 2 and the sensor management device 3. Also, the control device 2 does not need to execute matching of "event data", which changes dynamically, and thus it is possible to suppress an increase in the processing load. On the other hand, a sensor management device 3 is provided for each sensor (or for each attribute of the sensor), and thus the sensor management device 3 is less likely to execute matching of "event data", which changes dynamically, for a plurality of pairs, and even if the is the case, it is conceivable that the number of pairs will be small. Accordingly, the processing load of the sensor management device 3 is also less likely to drastically increase. Accordingly, in the first embodiment of the present invention, it is possible to prevent a drastic increase in the processing load on the control device 2, and even if "event data", which changes dynamically, is used as a condition for matching, it is possible to deliver sensing data from a data provider to a data user, thus facilitating use of the sensing data.

Example of System Configuration

Figure 2:
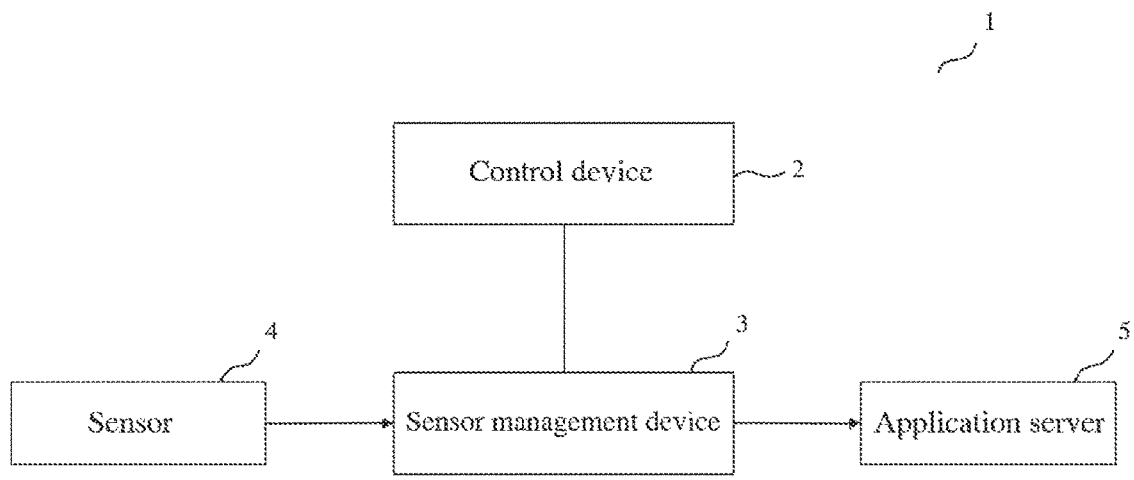
FIG. 2 is a diagram illustrating an example of a configuration of the data providing system 1 according to the first embodiment of the present invention.

FIG. 2 is a diagram showing an example of a configuration of the data providing system 1 according to the first embodiment of the present invention. As shown in FIG. 1, the data providing system 1 includes the control device 2, the sensor management device 3, the sensor 4, and the application server 5.

The control device 2 is a device that executes matching between sensor-side metadata and application-side metadata. The control device 2 is, for example, a so-called server device or a computer (such as a desktop computer, a laptop computer, or a tablet, for example). Note that the control device 2 is not limited to these examples.

The control device 2 acquires, from a data provider, sensor-side metadata, which is attribute information of sensing data. The sensor-side metadata is, for example, information relating to a sensor that can output sensing data. The sensor-side metadata includes, as the information relating to sensing data, at least some of a category, a measurement object, a measurement item, a measurement location, a measurement time of the sensing data, and the like, for example. Note that the sensor-side metadata is not limited to these examples, and may include any information as long as it relates to sensing data. Note that the sensor-side metadata may also be, for example, part of the sensing data itself. The sensor-side metadata can be created by a data provider for example, and may be transmitted to the control device 2 via a device (not-shown) usable by a data user, or may be directly input to the control device 2.

In the first embodiment of the present invention, the sensor-side metadata contains data (event data) of the sensing data that changes every time a measurement is made. The sensor-side metadata may also contain event data, which is data that changes every time a measurement is made, such as "temperature" that changes from moment to moment, a "still view image" captured from a mobile object, or "electric power" generated through photovoltaic power generation, for example. Note that the event data is not limited to these examples, and may be any data as long as it changes every time a measurement is made.

Furthermore, the control device 2 acquires, from a data user, application-side metadata that indicates content of sensing data desired to be used by the data user. The application-side metadata is, for example, information relating to an application that uses the sensing data. For example, the application-side metadata includes, as the information relating to sensing data desired to be used, at least some of a category, a measurement object, a measurement item, a measurement location, and a measurement time of the sensing data desired to be used, and the like. Note that the application-side metadata is not limited to these examples, and may include any information as long as it relates to sensing data. The application-side metadata can be created by the data user, and may be transmitted to the control device 2 via the application server 5, or may be directly transmitted to the control device 2.

In the first embodiment of the present invention, the application-side metadata contains a condition (event condition) relating to information that changes dynamically. In other words, the application-side metadata contains an "event condition". "Event condition" is a condition relating to information that changes dynamically, and examples thereof include a condition for a measurement location and a condition for measurement time. The application-side metadata contains, as the "event condition", "when the temperature is 30 degrees or higher", "when the generated electric power is 1 W or greater", and the like, for example. The information that changes dynamically may also contain data that changes every time a measurement is made, that is, event data, and the "event condition" may also be a condition relating to event data. Note that the information that changes dynamically is not limited to these examples, and may be any information as long as it changes dynamically.

The control device 2 executes matching between the sensor-side metadata and the application-side metadata. The control device 2 determines that the matching is successful if, for example, there is sensor-side metadata that matches the application-side metadata. The control device 2 may also determine that the matching is successful if, for example, at least some of the sensor-side metadata matches at least some of information contained in the application-side metadata. Furthermore, the control device 2 may also determine that the matching is successful if, for example, there is sensor-side metadata that satisfies a predetermined condition contained in the application-side metadata.

In the first embodiment of the present invention, the control device 2 can perform matching based on static information (static components) contained in the sensor-side metadata and the application-side metadata. For example, the control device 2 determines that the matching is successful based on static information (static components) such as a "category", a "data delivery entity", or "measurement object name" that are contained in both the sensor-side metadata and the application-side metadata.

If the matching is successful, the control device 2 then gives, to the sensor management device 3, a "data flow control command" that includes information relating to a sensor (sensor-related information), and information relating to an application that uses sensing data (application-related information). The sensor-related information is, for example, an identifier that can identify a sensor that transmits the sensing data, and is used to specify the sensor. Furthermore, the application-related information is, for example, an identifier that can identify an application that uses the sensing data, and is used to specify the application.

In the first embodiment of the present invention, the data flow control command may also include information, of the sensing data, relating to data that changes every moment or data (event data) that changes every time a measurement is made, both types of data being contained in the sensor-side metadata. Furthermore, the data flow control command may also include an "event condition", which is a condition that relates to information that changes dynamically, and is contained in the application-side metadata. The "event condition" is, for example, a condition that is contained in the application-side metadata and relates to information (including event data) that changes dynamically. Note that the event data is not limited to data of sensing data that changes every moment or every time a measurement is made, and may be data that changes every moment or every time a measurement is made, obtained by another sensor different from the sensor that collects the sensing data. For example, the event data may also be a condition that relates to an image itself captured by a camera, which is a sensor, or a condition that relates to data of another sensor such as a global positioning system (GPS) attached to this camera.

The sensor management device 3 is a device that delivers sensing data from the sensor 4 to the application server 5 in accordance with an instruction (data flow control command) from the control device 2. The sensor management device 3 is, for example, a so-called server device or a computer (such as a desktop computer, a laptop computer, or a tablet, for example). Note that the sensor management device 3 is not limited to these examples.

Based on the data flow control command received from the control device 2, the sensor management device 3 instructs the sensor 4 to deliver the sensing data to the application server 5. The sensor management device 3 specifies, based on the sensor-related information contained in the data flow control command, the sensor 4 from which the sensing data is to be acquired. Furthermore, the sensor management device 3 specifies, based on the information relating to the application server 5 that is contained in the data flow control command, the application server 5 to which the sensing data is to be delivered. The sensor management device 3 instructs the specified sensor 4 to deliver the sensing data to the specified application server 5.

Furthermore, the sensor management device 3 may also instruct the sensor 4 to "deliver the sensing data to the application server 5", if information relating to event data satisfies an event condition. For example, if data (event data) of the sensing data that changes every moment or every time a measurement is made satisfies the event condition, the sensor management device 3 may also instruct the sensor 4 to deliver the sensing data to the application server 5. For example, if a temperature (event data) detected by a thermometer, which is a sensor, satisfies a condition (event condition) of being 30 degrees or higher, the sensor management device 3 may also instruct the thermometer, which is a sensor, to deliver the temperature to the application server 5.

Furthermore, the sensor management device 3 may also instruct the sensor 4 to deliver the sensing data to the application server 5, if, for example, another piece of data that relates to the sensing data and changes every moment or every time a measurement is made satisfies an event condition. For example, if data of a GPS, which is another sensor 7 attached to a camera, satisfies an event condition (for example, within a radius of 20 m from the front of Nijo-jo Castle), the sensor management device 3 may also instruct the camera to deliver a captured image to the application server 5.

The sensor 4 is a device that collects sensing data. The sensor 4 may be any device as long as it can collect data. The sensor 4 may also be any device such as, for example, a camera that can collect images, moving images, and the like, a thermometer/hygrometer that can measure, for example, a temperature/humidity, a rain gauge/wind gauge that can measure rainfall/wind speed, or a GPS that can measure a location.

The application server 5 is a device that can use sensing data. The application server 5 is, for example, a so-called server device or a computer (such as a desktop computer, a laptop computer, or a tablet, for example), a smartphone or a mobile phone (for example, a feature phone), a computer (such as a desktop computer, a laptop computer, or a tablet, for example), a personal digital assistant (PDA), a wearable terminal, or the like. Note that the application server 5 is not limited to these examples.

The application server 5 can use sensing data to provide various types of services. For example, the application server 5 can use a still view image, serving as sensing data, to provide a service relating to virtual sightseeing. "Virtual sightseeing" enables, for example, a user in Tokyo to have an experience, with a view of the city of Kyoto displayed on his or her smartphone, as if he or she is sightseeing in Kyoto. Note that the service that the application server 5 can provide is not limited to virtual sightseeing, and may be any service.

Note that the control device 2, the sensor management device 3, the sensor 4, and the application server 5 may be connected to each other via a not-shown network (NW) 6. The NW 6 is, for example, a wired network or a wireless network. Specifically, the NW 6 is a wireless LAN (WLAN), a wide area network (WAN), an integrated service digital network (ISDN), a wireless LAN, a long term evolution (LTE) network, a code division multiple access (CDMA) network, or the like. Note that the NW 6 is not limited to these examples, and may be, for example, a public switched telephone network (PSTN) or Bluetooth (registered trademark), or satellite-based communication, and may be any type of NW.

Example of Configuration of Control Device 2

Figure 3:
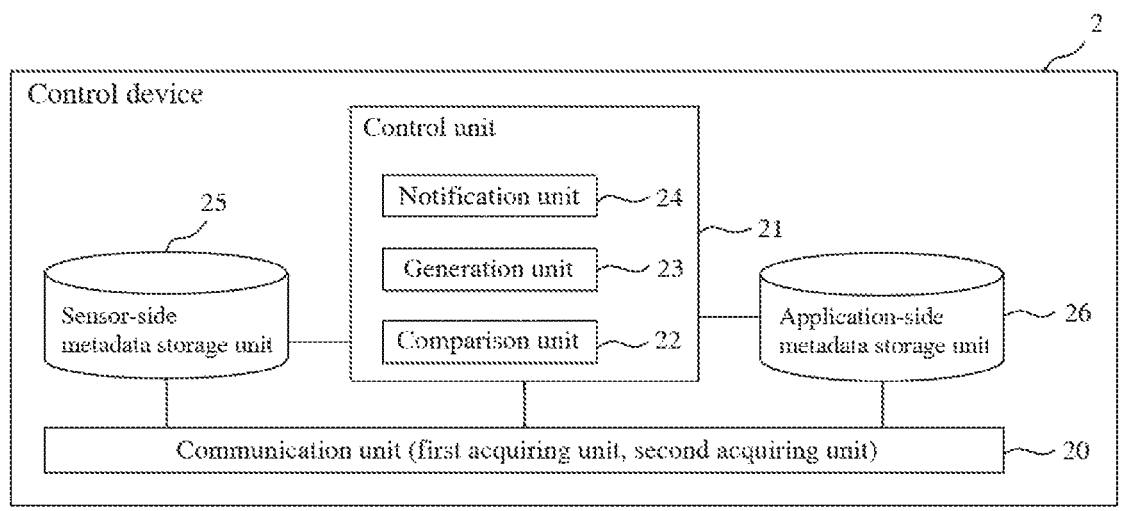
FIG. 3 is a diagram illustrating an example of a configuration of a control device 2 according to the first embodiment of the present invention.

FIG. 3 is a diagram showing an example of a configuration of the control device 2 according to the first embodiment of the present invention. As shown in FIG. 3, the control device 2 includes a communication unit 20, a control unit 21, a sensor-side metadata storage unit 25, and an application-side metadata storage unit 26.

The communication unit 20 is a communication interface for connection to the sensor management device 3, the sensor 4, and the application server 5. The control device 2 transmits a data flow control command to the sensor management device 3 via the communication unit 20. Furthermore, the control device 2 receives sensor-side metadata or application-side metadata via the communication unit 20. The communication executed by the communication unit 20 may be wired communication or wireless communication, and may employ any communication protocol.

The communication unit 20 functions as a first acquiring unit for receiving sensor-side metadata, and a second acquiring unit for receiving application-side metadata. In the example of FIG. 3, one communication unit 20 has both functions of the first acquiring unit for receiving sensor-side metadata, and the second acquiring unit for receiving application-side metadata, but the first acquiring unit and the second acquiring unit may also be provided as separate configurations (separate interfaces).

The control unit 21 functions to execute matching between sensor-side metadata and application-side metadata. The control unit 21 has the function of executing a predetermined function in accordance with a code or instruction in a program, and is a central processing unit (CPU), for example. Furthermore, the control unit 21 may also be, for example, a microprocessor, a multiprocessor, an application-specific integrated circuit (ASIC), a field programmable gate array (FPGA), or the like. Note that, in the first embodiment of the present invention, the control unit 21 is not limited to these examples.

As shown in FIG. 3, the control unit 21 includes, for example, a comparison unit 22, a generation unit 23, and a notification unit 24.

The comparison unit 22 executes matching between sensor-side metadata and application-side metadata. The comparison unit 22 determines whether or not there is sensor-side metadata that matches application-side metadata. Furthermore, the comparison unit 22 may also determine whether or not, for example, there is sensor-side metadata that matches at least part of information contained in the application-side metadata. Furthermore, the comparison unit 22 may also determine whether or not, for example, there is sensor-side metadata that satisfies a predetermined condition contained in the application-side metadata.

In the first embodiment of the present invention, the comparison unit 22 can execute matching based on, for example, static information (static components) contained in sensor-side metadata and application-side metadata. For example, the comparison unit 22 executes matching between sensor-side metadata and application-side metadata with reference to the sensor-side metadata storage unit 25 and the application-side metadata storage unit 26.

The comparison unit 22 may also execute, every time application-side metadata is received, matching between sensor-side metadata and the application-side metadata, for example. Furthermore, the comparison unit 22 may also execute matching between sensor-side metadata and application-side metadata at a predetermined cycle, for example. Furthermore, the comparison unit 22 may also execute matching between sensor-side metadata and application-side metadata upon receiving a request from a data user, for example. Note that the timing at which the comparison unit 22 executes matching is not limited to these examples, and may be any timing.

If matching executed by the comparison unit 22 is successful, the generation unit 23 generates, based on the result of the matching, a data flow control command that includes information relating to a sensor and information relating to an application that uses sensing data. The generation unit 23 generates, based on the matched sensor-side metadata, a data flow control command that includes information relating to the sensor 4 that can provide the sensing data. The generation unit 23 adds, to the data flow control command, an identifier that can identify the sensor 4 and is contained in the matched sensor-side metadata, for example.

Furthermore, the generation unit 23 generates, based on the matched application-side metadata, a data flow control command that includes information relating to the application server 5 that uses the sensing data. The generation unit 23 adds, to the data flow control command, an identifier that can identify the application server 5 and is contained in the matched application-side metadata, for example.

Furthermore, the generation unit 23 may also add, to the data flow control command, information relating to data (event data) of the sensing data that changes every moment or every time a measurement is made, the information being contained in the sensor-side metadata. Furthermore, the generation unit 23 may add, to the data flow control command, an "event condition", which is a condition that relates to information that dynamically changes, and is contained in the application-side metadata. Note that the event data is not limited to data of the sensing data that changes every moment or every time a measurement is made, and may be data that changes every moment or every time a measurement is made, obtained by another sensor different from the sensor that collect the sensing data.

Here, the comparison unit 22, the generation unit 23, and the notification unit 24 are realized, for example, by a central processing unit, a microprocessor, a processor core, a multiprocessor, an application-specific integrated circuit (ASIC), a field programmable gate array (FPGA), or the like.

The notification unit 24 gives the data flow control command generated by the generation unit 23 to the sensor management device 3 via the communication unit 20.

The control device 2 includes the sensor-side metadata storage unit 25. The sensor-side metadata storage unit 25 stores sensor-side metadata received via the communication unit 20. The sensor-side metadata storage unit 25 is realized by any of various types of storage media such as a hard disk drive (HDD), a solid state drive (SSD), and a flash memory, for example. Note however that, in the first embodiment of the present invention, the sensor-side metadata storage unit 25 is not limited to these examples.

The control device 2 includes the application-side metadata storage unit 26. The application-side metadata storage unit 26 stores application-side metadata received via the communication unit 20. The application-side metadata storage unit 26 is realized by any of various types of storage media such as a HDD, a SSD, and a flash memory, for example. Note however that, in the first embodiment of the present invention, the application-side metadata storage unit 26 is not limited to these examples.

Example of Configuration of Sensor Management Device 3

Figure 4:
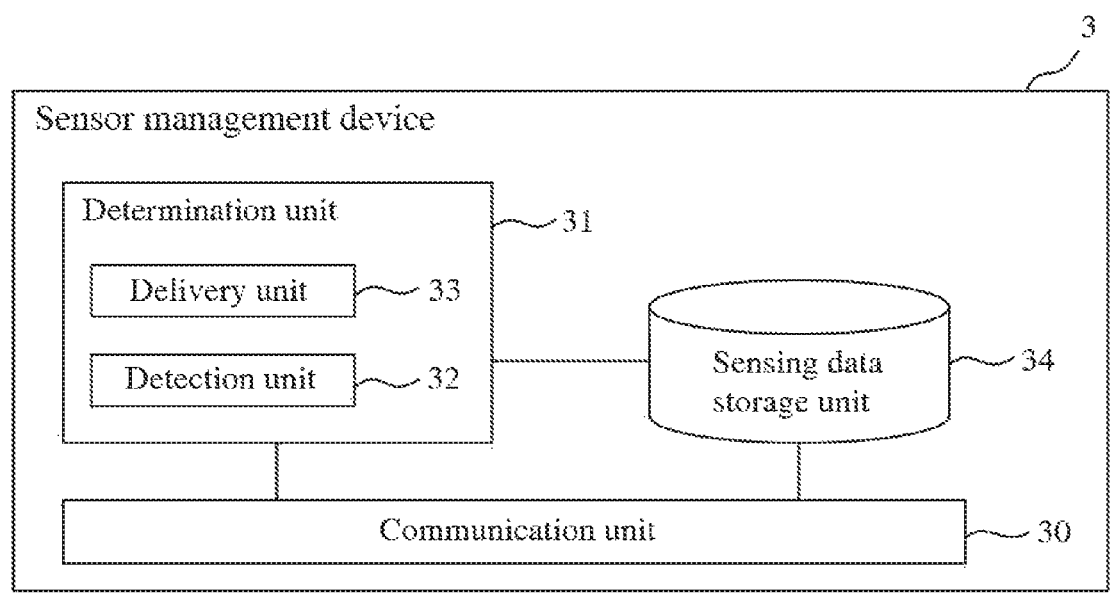
FIG. 4 is a diagram illustrating an example of a configuration of a sensor management device 3 according to the first embodiment of the present invention.

FIG. 4 is a diagram showing an example of a configuration of the sensor management device 3 according to the first embodiment of the present invention. As shown in FIG. 4, the sensor management device 3 includes a communication unit 30, a determination unit 31 and a sensing data storage unit 34.

The communication unit 30 is a communication interface for connection to the control device 2, the sensor 4, and the application server 5. The sensor management device 3 receives a data flow control command from the control device 2 via the communication unit 30.

Furthermore, the sensor management device 3 receives sensing data from the sensor 4 via the communication unit 30. For example, the sensor management device 3 receives an image captured by a camera, which is a sensor 4, via the communication unit 30. Note that the sensor management device 3 may also receive data relating to sensing data from another sensor 7 attached to the sensor 4 via the communication unit 30. For example, the sensor management device 3 may also receive data of a GPS, which is another sensor 7 attached to the camera, via the communication unit 30.

Furthermore, the sensor management device 3 instructs, via the communication unit 30, the sensor 4 to deliver the sensing data to the application server 5. Note that the sensor management device 3 may also transfer the sensing data received from the sensor 4 to the application server 5, instead of instructing the sensor 4 to deliver it.

The determination unit 31 functions to determine whether or not, of the sensing data received from the sensor 4, data (event data) that changes every moment or every time a measurement is made satisfies an "event condition" contained in the data flow control command. The determination unit 31 has the function of executing a predetermined function in accordance with a code or instruction in a program, and is a central processing unit (CPU), for example. Furthermore, the determination unit 31 may also be, for example, a microprocessor, a multiprocessor, an ASIC, a FPGA, or the like. Note that, in the first embodiment of the present invention, the determination unit 31 is not limited to these examples.

As shown in FIG. 4, the determination unit 31 includes, for example, a detection unit 32 and a delivery unit 33.

The detection unit 32 detects that, of the sensing data received from the sensor 4, data (event data) that changes every moment or every time a measurement is made satisfies an "event condition" contained in the data flow control command. For example, the detection unit 32 detects that an image captured by the camera, which is a sensor 4, satisfies an "event condition" set in the application-side metadata. Furthermore, the detection unit 32 may also detect that data relating to sensing data satisfies a predetermined condition of an "event condition". For example, the detection unit 32 may also detect that data of a GPS, which is another sensor 7 attached to the camera, satisfies an "event condition". Note that the detection unit 32 specifies a sensor 4 based on information that specifies the sensor 4 contained in the data flow control command, and detects that the sensing data received from the specified sensor 4 satisfies an "event condition".

If it is detected by the detection unit 32 that event data contained in sensing data satisfies an "event condition", the delivery unit 33 instructs the sensor 4 to deliver the sensing data to the application server 5. For example, if it is detected that an image (event data) captured by a camera, which is a sensor 4, satisfies an "event condition", the delivery unit 33 instructs the camera to deliver this image. Furthermore, if it is detected by the detection unit 32 that data relating to sensing data satisfies an "event condition", the delivery unit 33 instructs the sensor 4 to deliver this sensing data to the application server 5. For example, if it is detected that data (event data) of a GPS, which is another sensor 7 attached to the camera, satisfies an "event condition", the delivery unit 33 instructs the camera to deliver the image.

Note that, when sensing data is received from a sensor 4, the delivery unit 33 may also deliver the received sensing data to the application server 5, instead of instructing the sensor 4 to deliver the sensing data.

The sensing data storage unit 34 stores sensing data received from the sensor 4. Note that the sensing data storage unit 34 may temporarily store, for example, sensing data received from the sensor 4. Note that the sensing data storage unit 34 is realized by any of various types of storage media such as a HDD, a SSD, a flash memory, for example. Note however that, in the first embodiment of the present invention, the sensing data storage unit 34 is not limited to these examples.

Example of Operation

Figure 5:
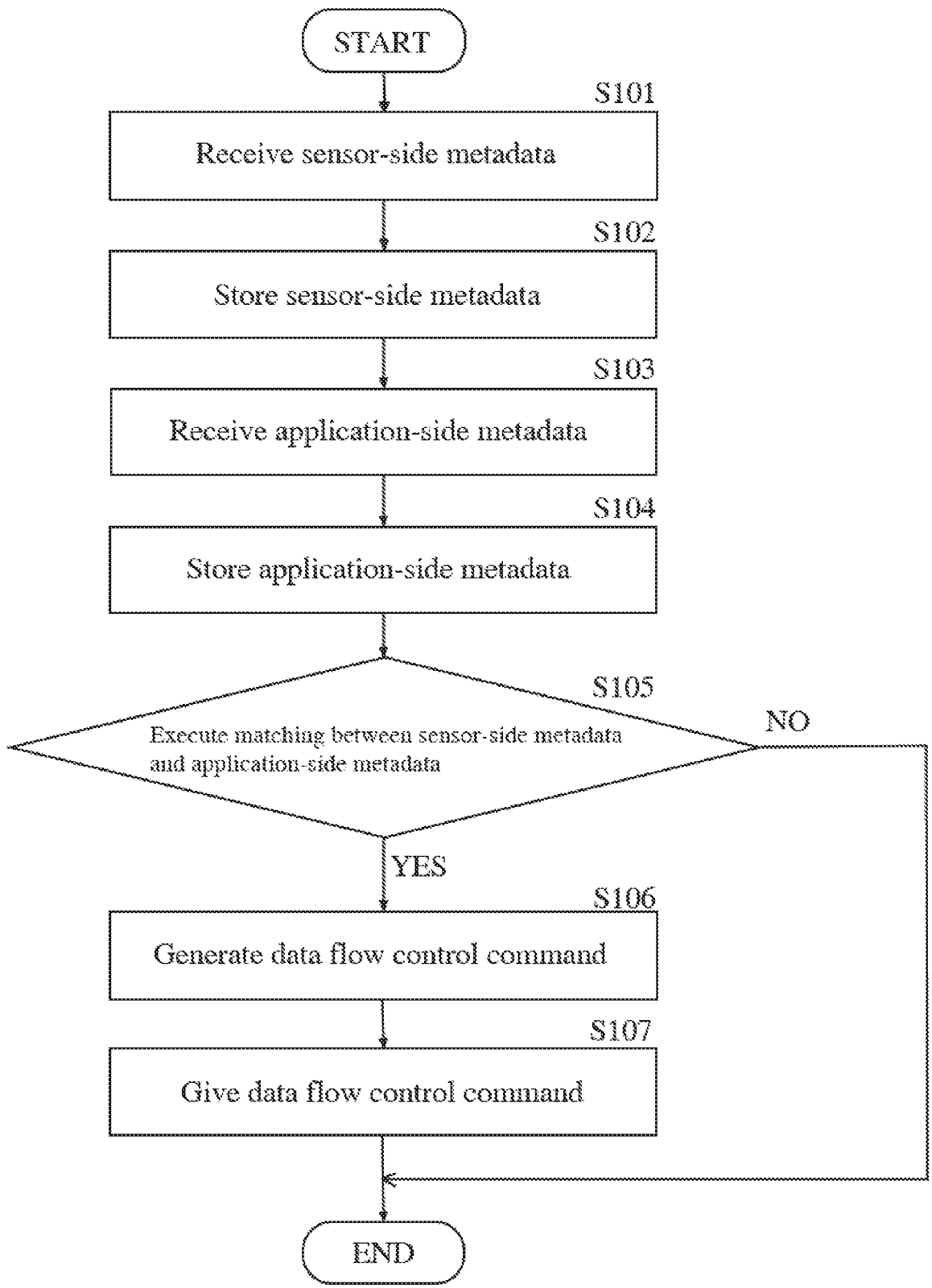
FIG. 5 is a flowchart illustrating an example of an operation of the control device 2 according to the first embodiment of the present invention.

FIG. 5 is a flowchart showing an example of an operation of the control device 2 according to the first embodiment of the present invention.

The communication unit 20 of the control device 2 receives sensor-side metadata, which is information relating to sensing data, from a data provider (step S101), and stores the received sensor-side metadata in the sensor-side metadata storage unit 25 (step S102). Note that the communication unit 20 receives a plurality of pieces of sensor-side metadata from a plurality of data providers, and every time a piece of sensor-side metadata is received, the communication unit 20 stores the received piece of sensor-side metadata in the sensor-side metadata storage unit 25.

Furthermore, the communication unit 20 receives, from a data user, application-side metadata that indicates content of sensing data desired to be used by the data user (step S103), and stores the received application-side metadata in the application-side metadata storage unit 26 (step S104).

Note that the processes in steps S101 and S102 and the processes in steps S103 and S104 may also be executed in reverse order, such that the processes in steps S103 and S104 are first executed, and then the processes in steps S101 and S102 are executed.

The comparison unit 22 executes matching between the sensor-side metadata and the application-side metadata (step S105). The comparison unit 22 determines whether or not, for example, static information contained in the application-side metadata matches static information contained in the application-side metadata.

If the matching executed by the comparison unit 22 is successful (YES in step S105), the generation unit 23 generates, based on a result of the matching, a data flow control command that includes information relating to the sensor 4 and information relating to the application server 5 that uses the sensing data (step S106). Note that the generation unit 23 adds, to the data flow control command, information relating to data (event data) of the sensing data that changes every moment or every time a measurement is made, and is contained in the sensor-side metadata. Furthermore, the generation unit 23 adds, to the data flow control command, an "event condition", which is a condition relating to information that changes dynamically and is contained in the application-side metadata. On the other hand, if the matching executed by the comparison unit 22 is not successful (NO in step S105), the generation unit 23 ends the procedure.

The notification unit 24 gives the data flow control command generated by the generation unit 23 to the sensor management device 3 via the communication unit 20 (step S107).

Figure 6:
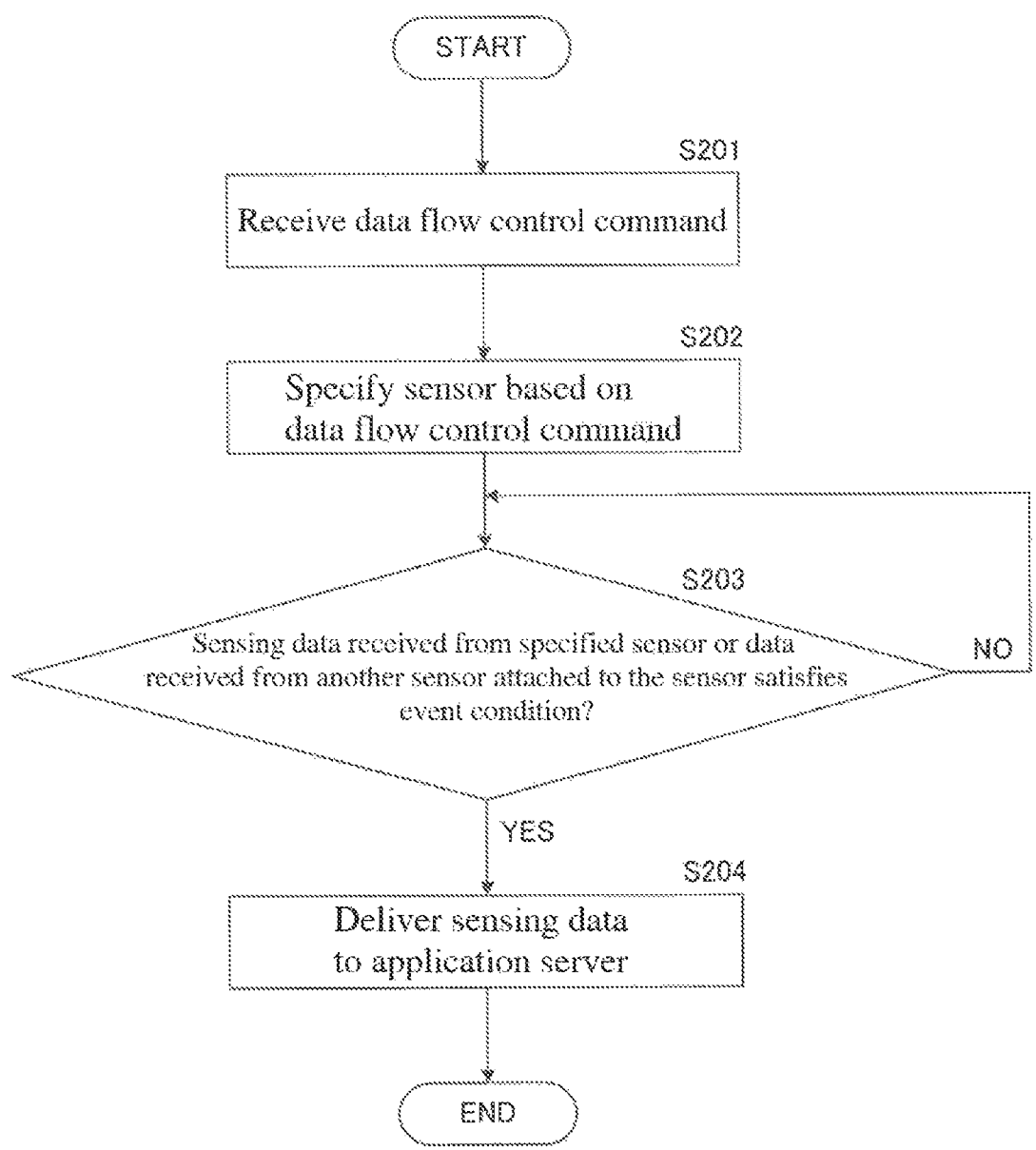
FIG. 6 is a flowchart illustrating an example of an operation of the sensor management device 3 according to the first embodiment of the present invention.

FIG. 6 is a flowchart showing an example of an operation of the sensor management device 3 according to the first embodiment of the present invention.

The communication unit 30 of the sensor management device 3 receives the data flow control command from the control device 2 (step S201).

The detection unit 32 specifies a sensor 4 based on information that specifies the sensor 4 contained in the received data flow (step S202). The detection unit 32 determines whether or not the sensing data received from the specified sensor 4 or the data received from another sensor 7 attached to the sensor 4 satisfies the "event condition" contained in the data flow control command (step S203).

If it is determined by the detection unit 32 that the "event condition" is satisfied (YES in step S203), the delivery unit 33 delivers the sensing data to the application server 5 (step S204). Note that the application server 5 is specified through information that specifies an application server 5 that is contained in the data flow control command. On the other hand, if it is determined by the detection unit 32 that the predetermined condition is not satisfied (NO in step S203), the delivery unit 33 returns to step S203.

As described above, in the first embodiment of the present invention, the control device 2 executes, in advance, matching based on static information contained in sensor-side metadata and application-side metadata, and then the sensor management device 3 determines whether or not "event data" satisfies an "event condition", and judges whether or not the sensing data is to be delivered. Accordingly, the processing load required for the matching can be dispersed between the control device 2 and the sensor management device 3. Accordingly, the control device 2 does not need to execute matching using "event data" that changes dynamically, and thus it is possible to suppress an increase in the processing load. On the other hand, because a sensor management device 3 is provided for each sensor (or an attribute of the sensor), it is less likely that the sensor management device 3 needs to execute matching using "event data" that changes dynamically for a plurality of pairs, and thus the processing load thereof is less likely to drastically increase. Accordingly, in the first embodiment of the present invention, a drastic increase in the processing load on the control device 2 can be prevented, and even if "event data", which changes dynamically, is used as a condition for matching, sensing data from a data provider can be delivered to a data user, thus facilitating use of the sensing data.

Working Example 1

A working example 1 is a working example in which the data providing system 1 is applied to delivery of an image captured by an on-board camera, which is a sensor 4.

Figure 7:
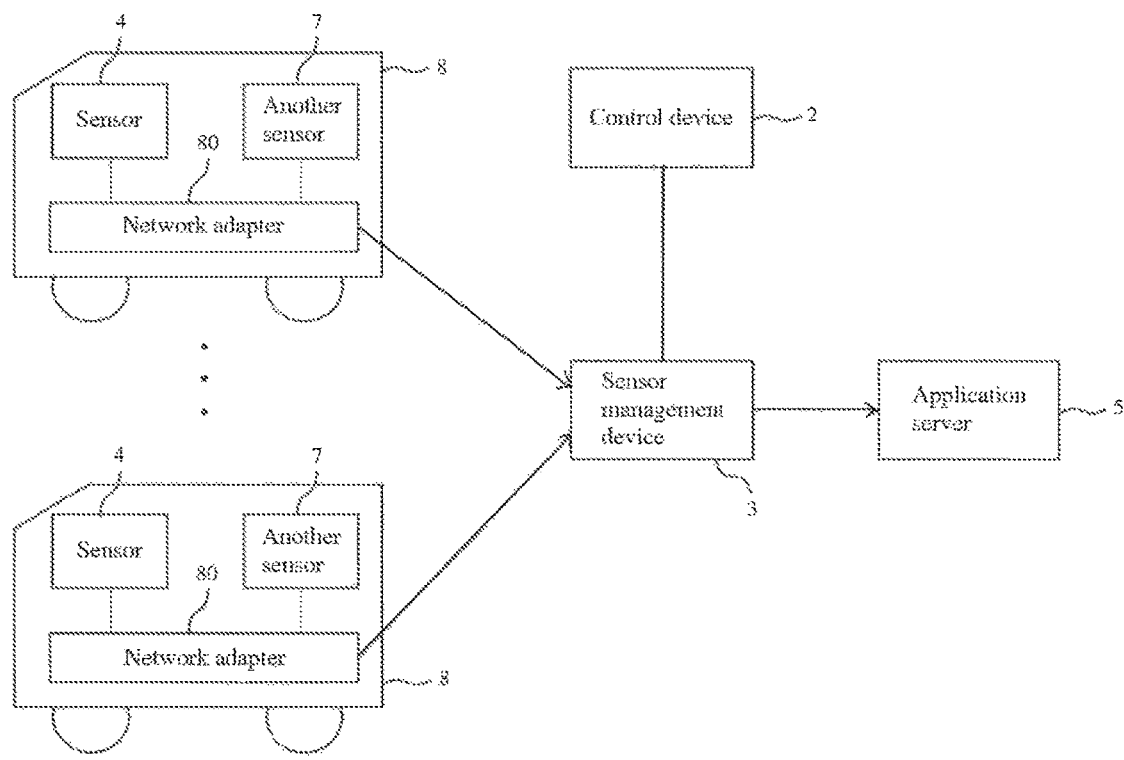
FIG. 7 is a diagram illustrating an example of an operation of the data providing system 1 according to a working example 1 of the first embodiment of the present invention.

FIG. 7 is a diagram showing an example of a configuration of the data providing system 1 according to the working example 1. As shown in FIG. 7, in the working example 1, the data providing system 1 includes mobile objects 8 each provided with a sensor 4 and another sensor 7.

The mobile objects 8 are, for example, moving objects such as automobiles, buses, motortrucks, or electric trains. Note that the mobile objects 8 are not limited to these examples, and may be any type of object as long as they are moving objects. Note that the following example will be described, taking a case where the mobile objects 8 are buses as an example.

As shown in FIG. 7, each mobile object 8 is provided with a sensor 4, another sensor 7, and a network adapter 80. The sensor 4 is, for example, a camera that can capture a view outside of the mobile object 8. The sensor 4 is, for example, a camera that can capture a view forward of and outside of the mobile object 8. Note that the direction in which the sensor 4 can capture a view outside of the mobile object 8 is not limited to the forward direction, and may be any direction out of forward, backward, leftward, and rightward directions. Furthermore, the sensor 4 may be able to capture a view outside of the mobile object 8 as a still image or as a moving image (video). Furthermore, the mobile object 8 may also be provided with a plurality of sensors 4.

The sensor 4 captures a view outside of the mobile object 8 at a predetermined timing. The predetermined timing may be, for example, a predetermined cycle, and may be any cycle such as a one second interval or a one minute interval. Furthermore, the predetermined timing may be, for example, a timing at which the mobile object 8 makes a turn at an intersection, a timing at which the mobile object 8 stops or starts moving, a timing at which the mobile object 8 accelerates or decelerates, or another timing. Furthermore, the predetermined timing may be a timing at which the time is at a predetermined time, a timing at which a request for image capture is made, or another timing.

The other sensor 7 is a sensor that collects information relating to the mobile object 8 at a predetermined timing. The other sensor 7 may also be any device such as, for example, a GPS that can measure the current location of the mobile object 8, or an acceleration sensor that can detect the speed or acceleration of the mobile object 8. Furthermore, if the mobile object 8 is a bus or an electric train, the other sensor 7 may also be a sensor that can detect the boarding situation or a vacant seat situation. The other sensor 7 is not limited to these examples, and may be any sensor as long as it can collect information relating to the mobile object 8.

The other sensor 7 collects information relating to the mobile object 8 at a predetermined timing. Similar to the case of the sensor 4, the predetermined timing may be any cycle such as a predetermined cycle (a one second interval or a one minute interval), a timing at which a predetermined time has come, or a timing at which a request for image capture is made, for example.

The network adapter 80 is a communication interface that can transmit sensing data collected by the sensor 4 or data collected by the other sensor 7. The sensor 4 or the other sensor 7 transmits, via the network adapter 80, the sensing data or the collected data to the sensor management device 3 or the application server 5.

As shown in FIG. 7, in the working example 1, there may be a plurality of mobile objects 8. Each of the plurality of mobile objects 8 can provide sensing data to be used by the application server 5.

FIG. 8 is a diagram showing an example of a configuration of sensor-side metadata that is received by the control device 2 according to the working example 1. As shown in FIG. 8, the sensor-side metadata includes information relating to sensing data that can be provided by at least one of the plurality of mobile objects 8. The sensor-side metadata partially contains dynamic information, in addition to static information. The dynamic information is, for example, a measurement item.

As shown in FIG. 8, the sensor-side metadata contains, as the static information, information indicating a category, a data delivery entity, or the like, for example. On the other hand, the sensor-side metadata contains, as an event condition, a measurement item, for example. The event condition is, for example, information that changes overtime or information that changes every time a measurement is made, and examples thereof include a measurement item, a measurement location, and a measurement time.

The sensor-side metadata contains a category of the sensing data. A category of the sensing data is, for example, "sightseeing", "mobile type", or the like. The information relating to a category is static information (static component).

Furthermore, the sensor-side metadata contains information relating to a data delivery entity, for example. The information relating to a data delivery entity is information relating to an entity that provides the sensing data. If a mobile object 8 provided with a sensor 4 is a bus, the information relating to a data delivery entity is a bus company name "bus business operator A" or the like. The information relating to a data delivery entity is static information (static component).

Furthermore, the sensor-side metadata contains, for example, a measurement object name, and is information indicating the name of an object for which sensing data is measured. If the mobile object 8 provided with the sensor 4 is a bus, the measurement object name is, for example, an area or a bus route in which the bus service is provided, a vehicle number with which the bus provided with the sensor 4 can be identified, or the like. In the example of FIG. 8, the measurement object name includes "area B, bus route C, bus numbers X, Y, Z". The information relating to a measurement object name is static information (a static component).

Furthermore, the sensor-side metadata contains, for example, a measurement item, which indicates content of sensing data measured by the sensor 4. The measurement item includes, for example, a "still view image", "real-time positional coordinates of the bus", "time", and the like. The measurement item is information that changes over time or information that changes every time a measurement is made, and is thus dynamic information. For example, "real-time positional coordinates of the bus" is an event condition because the positional coordinates change over time, namely, from moment to moment. Furthermore, a still view image captured from a moving bus changes every time an image is captured, and thus is an event condition.

Furthermore, the sensor-side metadata contains, for example, a data usage range, and contains information relating to a range in which use of sensing data is conceivable. The data usage range includes, for example, "non-commercial use", "virtual sightseeing", "urban area state recognition", and the like. The information relating to a data usage range is static information (a static component).

Furthermore, the sensor-side metadata contains an item "what can be handled as dynamic metadata", which indicates information usable as dynamic metadata. The information contained in the item "what can be handled as dynamic metadata" can be used as dynamic metadata. The information set as "what can be handled as dynamic metadata" is, for example, data of sensing data that changes every moment or every time a measurement is made. In the example of FIG. 8, the information set as what can be handled as dynamic metadata is "real-time positional coordinates of the bus" and "time".

Furthermore, the sensor-side metadata may contain, for example, detailed information of an event condition. In the example of FIG. 8, detailed information of an event condition includes "mobile type" for a measurement location, and a "detailed operation schedule" of the bus. Information relating to a measurement location is information relating to a location at which the sensing data is measured, and is information indicating whether it is fixed-type information or mobile-type information, or information relating to a specific measurement location. Furthermore, detailed information of a dynamic component includes "an interval of one second" for measurement time. The information relating to measurement time is information relating to time or a time period at which or for which the sensing data is measured.

FIG. 9 is a diagram showing an example of a configuration of application-side metadata that is received by the control device 2 in the working example 1. As shown in FIG. 9, the application-side metadata includes information relating to sensing data desired to be used by the application server 5. As shown in FIG. 9, the application-side metadata contains static information and dynamic information. The static information (static component) is, for example, information indicating a category, a data delivery entity, and the like. The event condition is, for example, information that changes over time, and includes a measurement location and a measurement time, for example.

The application-side metadata contains a category of data desired to be used, such as "sightseeing" and "mobile type", for example. Furthermore, the application-side metadata contains, for example, information relating to a data delivery entity, and is, for example, information relating to an entity that provides sensing data, and the like, and is "bus business operator A" in the example of FIG. 9. Furthermore, the application-side metadata includes a measurement object name, which is information indicating the name of a measurer (measurement object) of sensing data desired to be used. The measurement object name is, for example, "area B, bus route C, bus numbers X, Y, Z" and the like. Furthermore, the application-side metadata contains a data usage range, and the data usage range is, for example, information relating to a "usage" of the sensing data. In the example of FIG. 9, the data usage range is, for example, "virtual sightseeing". These pieces of information are static information (static components).

Note that, in the application-side metadata, if there is no need to specify, for example, a category, a data delivery entity, a measurement object name, and a data usage range of the sensing data, these items may be blank or may include information indicating that no specification is needed (such as XXX).

The application-side metadata contains, for example, a measurement item, and can designate an attribute, a property, and a characteristic of sensing data desired to be used. The measurement item is, for example, a "still view image", a "moving image", or the like. By designating the attribute of sensing data as the measurement item of application-side metadata, the data user or the application server 5 can specify the attribute of sensing data that the data user or the application servers desires to use. Furthermore, these pieces of information are pieces of information that change every moment or every time a measurement is made, and are event conditions.

The application-side metadata contains, for example, as event condition details, information relating to a state of the measurement location. By designating a state of the measurement location, the data user or the application server 5 can designate the measurement location of the sensing data that the data user or the application server 5 desires to use. In the example of FIG. 9, as a condition of the measurement location, "positional coordinates within a radius of 20 m from Nijo-jo Castle" is input, for example.

Furthermore, the application-side metadata contains, as the event condition details, information relating to measurement time, for example. By designating a condition of the measurement time, the data user or the application server 5 can designate the measurement time of the sensing data that the data user or the application server 5 desires to use. In the example of FIG. 9, as a condition of the measurement time, "first passing timing after 9:45" is input, for example.

The control device 2 receives, from a data provider, sensor-side metadata as exemplified in FIG. 8, and stores the received sensor-side metadata in the sensor-side metadata storage unit 25. Furthermore, the control device 2 receives, from the data user or the application server 5, application-side metadata as exemplified in FIG. 9, and stores the received application-side metadata in the application-side metadata storage unit 26.

The comparison unit 22 of the control device 2 executes matching between the sensor-side metadata and the application-side metadata. The comparison unit 22 searches for sensor-side metadata that matches items of static information (static components) of the application-side metadata with reference to the sensor-side metadata storage unit 25. The comparison unit 22 searches for sensor-side metadata that matches items of static information (static components) of the application-side metadata, based on the application-side metadata exemplified in FIG. 9, for example. Then, the comparison unit 22 specifies, as a result of the search based on the application-side metadata exemplified in FIG. 9, sensor-side metadata exemplified in FIG. 8.

Note that the comparison unit 22 may also search for sensor-side metadata that matches at least some of application-side metadata.

If the matching executed by the comparison unit 22 is successful, the generation unit 23 generates a "data flow control command" that includes information relating to the sensor 4 that can be specified based on the "measurement object name", which is an item of the sensor-side metadata, and information relating to the application server 5 from which the application-side metadata was transmitted. Furthermore, the generation unit 23 adds, to the data flow control command, information that relates to data (event data) of the sensing data that changes every moment or every time a measurement is made, and is contained in the sensor-side metadata. Furthermore, the generation unit 23 adds, to the data flow control command, an "event condition" that is a condition relating to information that dynamically changes, and is contained in the application-side metadata. The "event condition" is an event condition of the application-side metadata, and includes, in the example of FIG. 9, a "condition of a measurement location" and a condition of "measurement time". Specifically, the generation unit 23 adds, to the data flow control command, information indicating "positional coordinates within a radius of 20 m from Nijo-jo Castle" serving as a condition of a measurement location and "first passing timing after 9:45" serving as a condition of measurement time.

The notification unit 24 gives the data flow control command generated by the generation unit 23 to the sensor management device 3 via the communication unit 20.

The detection unit 32 of the sensor management device 3 determines whether or not sensing data received from a sensor 4 satisfies the "event condition" included in the data flow control command received from the control device 2. The detection unit 32 determines, for example, whether or not sensing data received from at least one of the sensors 4 included in a plurality of mobile objects 8 satisfies the "event condition". Furthermore, the detection unit 32 may also determine whether or not data received from another sensor 7 satisfies the "event condition".

For example, the detection unit 32 determines whether or not a still view image received from a camera, which is a sensor 4 included in each of the plurality of mobile objects 8, satisfies both of the conditions "positional coordinates within a radius of 20 m from Nijo-jo Castle" and "first passing timing after 9:45". For example, based on GPS data received from another sensor 7 included in a mobile object 8 together with a still view image received from a camera, which is a sensor 4, the detection unit 32 may also determine that the measurement location at which the still view image was captured satisfies both the conditions "positional coordinates within a radius of 20 m from Nijo-jo Castle" and "first passing timing after 9:45". Note that a GPS can collect, for example, information in which an identifier that can identify a mobile object 8, information relating to the current position (positional coordinates) of the mobile object 8, and information relating to the current time are associated with each other, and can transmit the information as another type of data to the sensor management device 3. Accordingly, the detection unit 32 can determine, based on the data received from the GPS, which is the other sensor 7, whether or not the sensing data received from the sensor 4 satisfies the "event condition".

The detection unit 32 performs processing to determine whether or not sensing data received from a sensor 4 satisfies the "event condition" until it receives the sensing data that satisfies the "event condition" included in the data flow control command.

If it is detected by the detection unit 32 that sensing data satisfies the "event condition", the delivery unit 33 instructs the sensor 4 to deliver the sensing data to the application server 5. If, for example, the still view image received from the sensor 4 is a still view image that satisfies the conditions "positional coordinates within a radius of 20 m from Nijo-jo Castle" and "first passing timing after 9:45", the delivery unit 33 instructs the sensor 4 to deliver the still view image to the application server 5.

Note that the delivery unit 33 may also deliver the still view image received from the sensor 4 to the application server 5, instead of instructing the sensor 4 to deliver it.

As described above, according to the working example 1 of the first embodiment of the present invention, in the data providing system 1 for delivering an image from an on-board camera, which is a sensor 4, it is possible to reduce the processing load on the control device 2 required for performing matching between information relating to the image from the on-board camera, which is a sensor 4, and information relating to an application that uses sensing data.

Working Example 2

A working example 2 is a working example in which the data providing system 1 is applied to various sensors 4.

FIG. 10 illustrate examples of configurations of sensor-side metadata and application-side metadata according to the working example 2. The control device 2 receives, for example, sensor-side metadata exemplified in FIG. 10(*a*) from a data provider. Note that the examples of FIG. 10 are examples of configurations of sensor-side metadata and application-side metadata in a case where a data user or an application server 5 examines the highest temperatures in the summer across the country. In this case, the sensors 4 are, for example, temperature sensors.

As shown in FIG. 10(a), the sensor-side metadata contains "weather" as a category, "Meteorological Agency" as a data delivery entity, and "sensor oo in oo city in oo prefecture" as a measurement object name. Furthermore, the sensor-side metadata contains "oo city in oo prefecture" as a measurement location, and "research" as a data usage range. These pieces of information are static information (static components).

Furthermore, the sensor-side metadata contains "temperature" and "time" as measurement items. These pieces of information are event conditions. Furthermore, the sensor-side metadata contains "temperature" and "time" as information set as data that can be handled as dynamic metadata. Also, the sensor-side metadata contains, as an event condition detail, "interval of one minute" regarding the measurement time.

On the other hand, the control device 2 receives, from the data user or the application server 5, application-side metadata exemplified in FIG. 10(b). The application-side metadata contains, as static information (static components), "weather" serving as a category, "Meteorological Agency" serving as a data delivery entity, "sensor oo in oo city in oo prefecture" serving as a measurement object name, "oo city in oo prefecture" serving as a measurement location, and "global warming research" serving as a data usage range. Furthermore, the application-side metadata contains, as event conditions, "temperature" and "time" serving as measurement items. Also, the application-side metadata contains, as event condition details, "temperature of 30 degrees or higher", "temperature", and "time" regarding measurement conditions.

The comparison unit 22 of the control device 2 executes matching of the sensor-side metadata, based on the static information included in the application-side metadata.

Then, the generation unit 23 adds, to a data flow control command, the dynamic information of the application-side metadata "when the temperature is 30 degrees or higher", as an "event condition". Note that the generation unit 23 adds, to the data flow control command, an identifier that can identify "sensor oo in oo city in oo prefecture" as information that specifies the sensor 4, and an identifier that can specify the application server 5.

The detection unit 32 of the sensor management device 3 monitors, based on the data flow control command received from the control device 2, information relating to the temperature, which is sensing data, the information being received from the "sensor oo in oo city in oo prefecture", which is the specified sensor 4. If the information relating to the temperature received from the "sensor oo in oo city in oo prefecture" satisfies the "event condition", that is, "when the temperature is 30 degrees or higher", the detection unit 32 instructs the delivery unit 33 to deliver the information relating to the temperature to the application server 5.

The delivery unit 33 instructs the "sensor oo in oo city in oo prefecture", which is a sensor 4, to deliver the information relating to the temperature, which is sensing data, to the application server 5. Note that the delivery unit 33 may also deliver the sensing data received from the sensor 4 to the application server 5, instead of instructing the sensor 4 to deliver it.

Furthermore, FIG. 11 illustrate other examples of the configurations of sensor-side metadata and application-side metadata, according to the working example 2. The control device 2 receives, for example, sensor-side metadata exemplified in FIG. 11(a) from a data provider. Note that the examples of FIG. 11 are examples of configurations of sensor-side metadata and application-side metadata in a case where a data user or an application server 5 is investing the production of solar power. In this case, the sensors 4 are, for example, electric voltage/current sensors.

As shown in FIG. 11(a), the sensor-side metadata contains "electric power" as a category, "power generation business operator B of solar cells" as a data delivery entity, "solar cell ΔΔ in ΔΔ city in ΔΔ prefecture" as a measurement object name, "ΔΔ city in ΔΔ prefecture" as a measurement location, and "research" as a data usage range, and these pieces of information are static information. Furthermore, the sensor-side metadata contains "voltage" and "time" as measurement items, and these pieces of information are event conditions. Furthermore, the sensor-side metadata contains "electric power" and "time" as information set as data that can be handled as dynamic metadata. Furthermore, "interval of one second" regarding the measurement time is contained as an event condition detail.

On the other hand, the control device 2 receives, from the data user or the application server 5, application-side metadata exemplified in FIG. 11(b). The application-side metadata contains "electric power" as a category, "power generation business operator B of solar cells" as a data delivery entity, "solar cell ΔΔ in ΔΔ city in ΔΔ prefecture" as a measurement object name, "ΔΔ city in ΔΔ prefecture" as a measurement location, and "solar cell research" as a data usage range, and these pieces of information are static information. Furthermore, the application-side metadata contains "electric power" and "time" as measurement items, and these pieces of information are event conditions. Also, the application-side metadata contains, as an event condition detail, "when the production of electricity is 1 W or greater", "electric power", and "time" regarding the measurement conditions.

The comparison unit 22 of the control device 2 executes matching of the sensor-side metadata, based on static information contained in the application-side metadata.

Then, the generation unit 23 adds, to a data flow control command, the dynamic information of the application-side metadata "when the production of electricity is 1 W or greater" as an "event condition". Note that the generation unit 23 adds, to the data flow control command, an identifier that can identify "solar cell ΔΔ in ΔΔ city in ΔΔ prefecture" as information that specifies the sensor 4, and an identifier that can specify the application server 5.

The detection unit 32 of the sensor management device 3 monitors, based on the data flow control command received from the control device 2, information relating to the temperature, which is sensing data, the information being received from the "solar cell ΔΔ in ΔΔ city in ΔΔ prefecture", which is the specified sensor 4. If the information relating to the electric power received from the "solar cell ΔΔ in ΔΔ city in ΔΔ prefecture" satisfies the "event condition", that is, "when the production of electricity is 1 W or greater", the detection unit 32 instructs the delivery unit 33 to deliver the information relating to the temperature to the application server 5.

The delivery unit 33 instructs the "solar cell ΔΔ in ΔΔ city in ΔΔ prefecture", which is a sensor 4, to deliver the information relating to electric power, which is sensing data, to the application server 5. Note that the delivery unit 33 may also deliver the sensing data received from the sensor 4 to the application server 5, instead of instructing the sensor 4 to deliver it.

Moreover, FIG. 12 illustrate yet other examples of the configurations of sensor-side metadata and application-side metadata, according to the working example 2. The control device 2 receives, for example, sensor-side metadata exemplified in FIG. 12(a) from a data provider. Note that the examples of FIG. 12 are examples of configurations of sensor-side metadata and application-side metadata in a case where a data user or an application server 5 is investigating whether or not a suspicious individual is in the city. In this case, the sensors 4 are, for example, security cameras.

As shown in FIG. 12(a), the sensor-side metadata contains "crime prevention" as a category, "owner C of a security camera in a park" as a data delivery entity, "camera ☐☐ in the park in ☐☐ town in ☐☐ city in ☐☐ prefecture" as a measurement object name, "☐☐ town in ☐☐ city in ☐☐ prefecture" as a measurement location, and "crime prevention" as a data usage range, and these pieces of information are static information (static components). Furthermore, the sensor-side metadata contains "image" and "time" as measurement items, and these pieces of information are event conditions. Furthermore, the sensor-side metadata contains "image" and "time" as information set as data that can be handled as dynamic metadata. Also, the sensor-side metadata contains, as an event condition detail, "interval of 0.1 seconds" regarding the measurement time.

On the other hand, the control device 2 receives, from a data user or an application server 5, application-side metadata exemplified in FIG. 12(b). The application-side metadata contains, as static information (static components), "crime prevention" serving as a category, "owner C of a security camera in a park" serving as a data delivery entity, "camera ☐☐ in the park in ☐☐ town in ☐☐ city in ☐☐ prefecture" serving as a measurement object name, "☐☐ town in ☐☐ city in ☐☐ prefecture" serving as a measurement location, and "crime prevention" serving as a data usage range. Furthermore, the application-side metadata contains, as event conditions, "image" and "time" serving as measurement items. Also, the application-side metadata contains, as event condition details, "when a suspicious individual appears on an image captured by the security camera", "image", and "time" regarding measurement conditions.

The comparison unit 22 of the control device 2 executes matching of the sensor-side metadata, based on the static information contained in the application-side metadata.

Then, the generation unit 23 adds, to a data flow control command, the dynamic information of the application-side metadata "when a suspicious individual appears on an image captured by the security camera" as an "event condition". Note that the generation unit 23 adds, to the data flow control command, an identifier that can identify "camera ☐☐ in the park in ☐☐ town in ☐☐ city in ☐☐ prefecture" as information that specifies the sensor 4, and an identifier that can specify the application server 5.

The detection unit 32 of the sensor management device 3 monitors, based on the data flow control command received from the control device 2, information relating to an image, which is sensing data, the information being received from the "camera ☐☐ in the park in ☐☐ town in ☐☐ city in ☐☐ prefecture", which is the specified sensor 4. If the image received from the "camera ☐☐ in the park in ☐☐ town in ☐☐ city in ☐☐ prefecture" includes a "captured suspicious individual", which is an "event condition", the detection unit 32 instructs the delivery unit 33 to deliver the information relating to the image to the application server 5. Note that the detection unit 32 can use various existing methods to detect whether or not the image includes a captured suspicious individual.

The delivery unit 33 instructs the "camera ☐☐ in the park in ☐☐ town in ☐☐ city in ☐☐ prefecture", which is a sensor 4, to deliver the image, which is sensing data, to the application server 5. Note that a delivery unit 33 may also deliver the sensing data received from the sensor 4 to the application server 5, instead of instructing the sensor 4 to deliver it.

As described above, in the working example 2 of the first embodiment of the present invention, the data providing system 1 is applicable to various sensors 4.

Second Embodiment

A second embodiment of the present invention is an embodiment in which, when a plurality of entities can provide sensor-side metadata, one of the plurality of data providers (for example, the plurality of entities) provides sensing data to an application server. Note that the second embodiment of the present invention is also applicable to the first embodiment.

Figure 13:
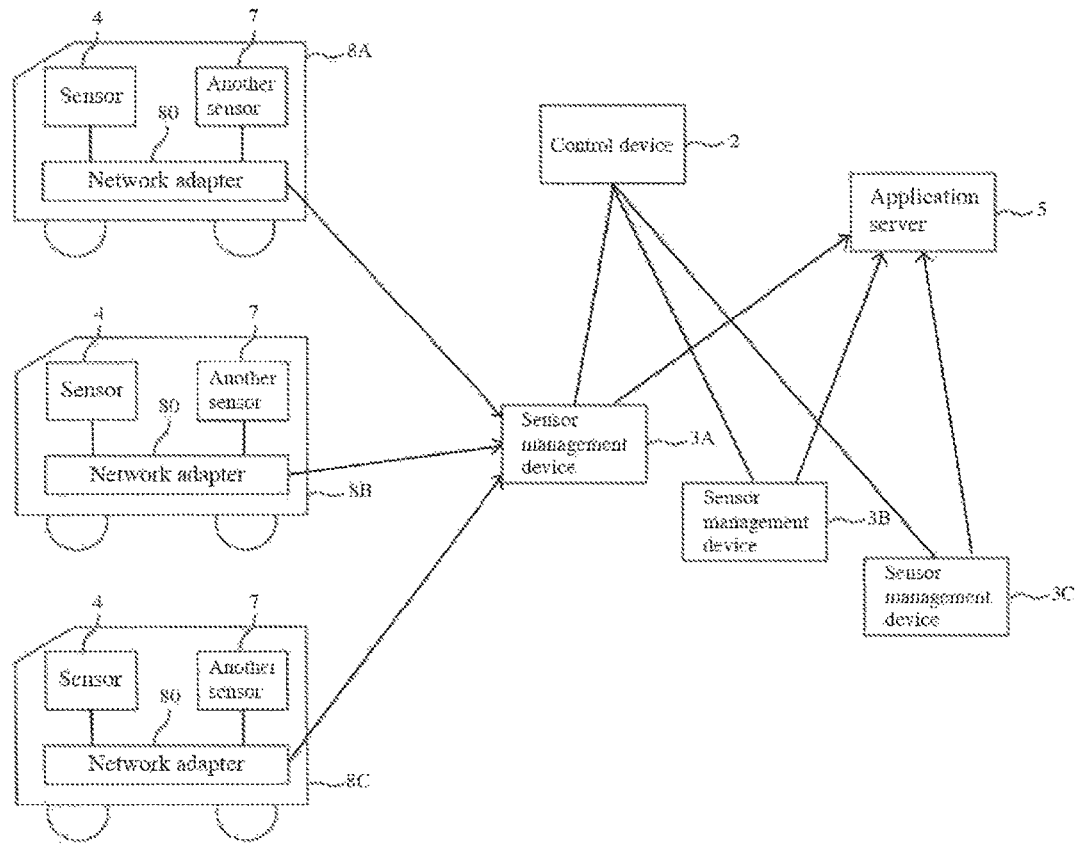
FIG. 13 is a diagram illustrating an example of a configuration of a data providing system 1 according to a second embodiment of the present invention.

FIG. 13 is a diagram showing an example of a configuration of the data providing system 1 according to the second embodiment of the present invention. As shown in FIG. 13, in the second embodiment of the present invention, the data providing system 1 includes a plurality of mobile objects 8 each provided with a sensor 4 and another sensor 7. The data providing system 1 further includes a plurality of sensor management devices 3 that manage at least one sensor 4 and another sensor 7.

Each of the plurality of sensor management devices 3 is provided for, for example, a data provider that can provide sensing data, and manages the sensor 4 and the other sensor 7 of this data provider. For example, in FIG. 13, a sensor management device 3A manages a sensor 4A and another sensor 7A that are included in a mobile object 8A belonging to a data provider A. Furthermore, a sensor management device 3B manages a sensor 4B and another sensor 713 that are included in a mobile object 8B belonging to a data provider B. Furthermore, a sensor management device 3C manages a sensor 4C and another sensor 7C that are included in a mobile object 8C belonging to a data provider.

Note that each of the sensor management devices 3 can manage a plurality of sensors 4 and a plurality of other sensors 7. For example, the sensor management device 3A can manage a plurality of sensors 4A and a plurality of other sensors 7A.

Figure 14:
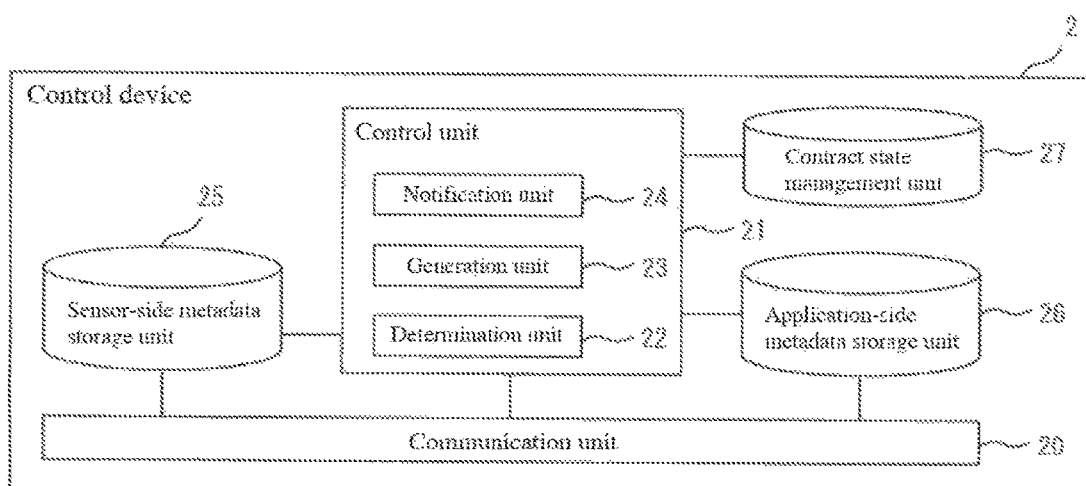
FIG. 14 is a diagram illustrating an example of a configuration of a control device 2 according to the second embodiment of the present invention.

FIG. 14 is a diagram showing an example of a configuration of the control device 2 according to the second embodiment of the present invention. As shown in FIG. 14, the control device 2 includes a contract state management unit 27.

The control device 2 receives sensor-side metadata from a plurality of data providers, for example. FIG. 15 illustrate examples of configurations of sensor-side metadata that are received from the data providers A to C, for example. As shown in FIG. 15, the sensor-side metadata received from the data providers A to C differ from each other in "data delivery entity" and "measurement object name" for example, and contain the same information regarding the remaining items.

The control device 2 receives, from a data user or an application server 5, application-side metadata exemplified in FIG. 9.

The comparison unit 22 of the control device 2 searches for sensor-side metadata that matches the items of the application-side metadata, with reference to the sensor-side metadata storage unit 25. As a result, the comparison unit 22 specifies the three pieces of sensor-side metadata shown in FIG. 15.

The generation unit 23 generates, for each of the pieces of sensor-side metadata specified by the comparison unit 22, a "data flow control command" that includes information relating to the sensor 4 and information relating to the application server 5. If, for example, three pieces of sensor-side metadata are specified by the comparison unit 22, the generation unit 23 generates three data flow control commands. Furthermore, the generation unit 23 adds, to each of the generated data flow control commands, an "event condition". For example, the generation unit 23 adds, to each of the generated data flow control commands, information that indicates "positional coordinates within a radius of 20 m from Nijo-jo Castle" and "first passing timing after 9:45", serving as "event conditions".

The notification unit 24 respectively gives the data flow control commands generated by the generation unit 23 to the plurality of sensor management devices 3 via the communication unit 20.

The contract state management unit 27 manages the plurality of sensor management devices 3 to which the data flow control commands were respectively given by the notification unit 24. For each request of use of data (that is, application-side metadata), the contract state management unit 27 stores the plurality of sensor management devices 3 that were instructed to deliver sensing data based on the request of use. The contract state management unit 27 stores, for one piece of application-side metadata, the sensor management devices 3 to which the instructions to deliver sensing data were given. In the example of FIG. 14, the contract state management unit 27 of the control device 2 stores, for each piece of application-side metadata, a plurality of sensor management devices 3 to which the instructions to deliver sensing data were given, in association with each other.

Furthermore, when any of the plurality of sensor management devices 3 has delivered the sensing data to the application server 5, the contract state management unit 27 notifies the other sensor management devices 3 of cancellation of the instruction to deliver the sensing data. For example, when the sensor management device 3A, out of the plurality of sensor management devices 3A to 3C, has delivered the sensing data to the application server 5, the contract state management unit 27 notifies the other sensor management devices 3B and 3C of cancellation of the instruction to deliver the sensing data.

Each of the plurality of sensor management devices 3 determines whether or not sensing data received from a sensor 4 satisfies a predetermined condition included in the data flow control command received from the control device 2. The detection unit 32 of each sensor management device 3 determines, for example, whether or not sensing data received from the sensor 4 included in a mobile object 8 satisfies a predetermined condition. Furthermore, the detection unit 32 may also determine whether or not data received from another sensor 7 satisfies the predetermined condition.

For example, a detection unit 32A of the sensor management device 3A in FIG. 13 determines that a still view image received from the camera that is a sensor 4 included in a mobile object 8 satisfies the conditions "positional coordinates within a radius of 20 m from Nijo-jo Castle" and "first passing timing after 9:45". In this case, if it is detected by the detection unit 32A that the sensing data satisfies the predetermined conditions, a delivery unit 33A of the sensor management device 3A instructs the sensor 4A to deliver the sensing data to the application server 5.

Furthermore, the delivery unit 33A of the sensor management device 3A notifies the control device 2 of the delivery of the sensing data to the application server 5.

When the control device 2 is notified of delivery of sensing data from one of the plurality of sensor management devices 3, the contract state management unit 27 of the control device 2 notifies the remaining sensor management devices 3 of cancellation of the instruction to deliver sensing data to the application server 5. In the example of FIG. 14, if the control device 2 is notified of delivery of sensing data from the sensor management device 3A, the contract state management unit 27 notifies the other sensor management devices 3B and 3C of cancellation of the instruction to deliver sensing data to the application server 5.

Upon being notified by the control device 2 of cancellation of the instruction to deliver sensing data, the remaining sensor management devices 3B and 3C cancel delivery of sensing data to the application server 5. Accordingly, the application server 5 receives sensing data from the sensor 4 that belongs to the one data provider and not from the other sensor 7, and thus sensing data having the same content can be prevented from being redundantly received.

Figure 16:
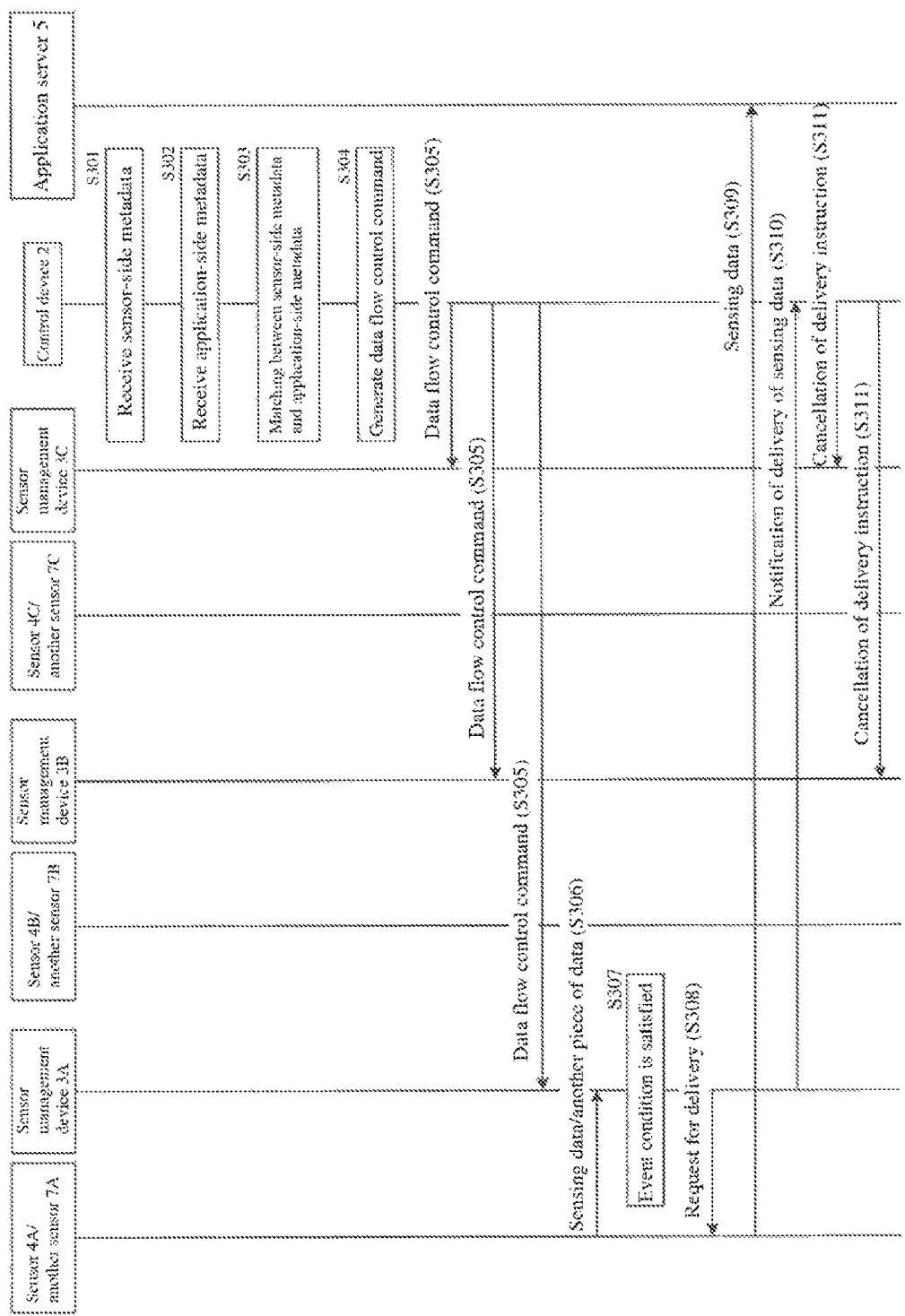
FIG. 16 is a sequence diagram illustrating an example of an operation of the data providing system according to the second embodiment of the present invention.

FIG. 16 is a sequence diagram showing an example of an operation of the data providing system 1 according to the second embodiment of the present invention.

The control device 2 receives sensor-side metadata from a plurality of data providers (step S301). The control device 2 receives application-side metadata from a data user or an application server 5 (step S302).

The control device 2 searches for sensor-side metadata that matches items of static information of the application-side metadata, with reference to the sensor-side metadata storage unit 25 (step S303). Then, the control device 2 generates, for each of the specified plurality of sensor-side metadata, a data flow control command (step S304). Then, the control device 2 respectively gives the generated data flow control commands to a plurality of sensor management devices 3 (step S305). In the example of FIG. 16, the control device 2 transmits the data flow control commands to the sensor management devices 3A to 3C.

For example, the sensor 4A or the other sensor 7A attached to this sensor 4A transmits sensing data or another piece of data to the sensor management device 3A (step S306).

The sensor management device 3A detects that, for example, the sensing data received from the sensor 4A satisfies a predetermined condition included in the data flow control command received from the control device 2 (step S307). The sensor management device 3A requests the sensor 4A to deliver the sensing data to the application server 5 (step S308).

The sensor 4A delivers the sensing data to the application server 5 in accordance with the request from the sensor management device 3A (step S309).

Upon requesting the sensor 4A to deliver the sensing data, the sensor management device 3A notifies the control device 2 of the delivery of the sensing data (step S310).

Upon being notified by the sensor management device 3A of the delivery of the sensing data, the control device 2 notifies the remaining sensor management devices 3B and 3C of cancellation of the instruction to deliver sensing data to the application server 5 (step S311). Upon being notified by the control device 2 of cancellation of the instruction to deliver sensing data, the remaining sensor management devices 3B and 3C cancel to deliver the sensing data to the application server 5.

As described above, in the second embodiment of the present invention, when at least one of a plurality of sensor management devices 3 has delivered sensing data, the control device 2 notifies the remaining sensor management device 3 of cancellation of delivery of sensing data. Then, upon being notified by the control device 2 of cancellation of the instruction to deliver sensing data, the other sensor management device 3 cancels the delivery of sensing data to the application server 5. Therefore, since the application server 5 receives sensing data from a sensor 4 and not from another sensor 7, the sensing data having the same content can be prevented from being redundantly received. In this way, in the second embodiment of the present invention, when a plurality of entities can provide sensor-side metadata, one of the plurality of data providers (for example, the plurality of entities) can provide sensing data to the application server.

The present invention has been described with reference to the drawings and the working examples, but it should be noted that a person skilled in the art can readily make various modifications and corrections based on the present disclosure. Accordingly, note that these modifications and corrections are included in the scope of the present invention. For example, functions and the like included in means, steps, and the like can be rearranged so that they do not logically contradict each other, and a plurality of means, steps, and the like may also be combined into one or divided. Moreover, configurations shown in the above-described embodiments may also be combined suitably with each other.

The present invention may also be formulated in the following.

Appendix 1

A control device comprising:
a memory in which a first acquiring unit configured to acquire sensor-side metadata, a second acquiring unit configured to acquire application-side metadata, a comparison unit configured to extract a sensor that can provide sensing data, and an instruction unit configured to transmit a data flow control command are stored; and
    a hardware processor connected to the memory,
    wherein the hardware processor is configured to:
    acquire the sensor-side metadata, which is information relating to a sensor that can output sensing data;
    acquire the application-side metadata, which is information relating to an application that uses the sensing data;
    execute matching between the sensor-side metadata and the application-side metadata to extract a sensor that can provide sensing data that meets a request of the application; and
    transmit, to a sensor management device that manages the sensor, a data flow control command that includes information that can specify the sensor extracted by the comparison unit, and the application; and
    wherein the sensor-side metadata contains information that designates part of the metadata as being able to be handled as dynamic data,
    the application-side metadata contains a condition that part of the metadata is required to be handled as dynamic data, and a dynamic handling condition, and
    the data flow control command includes the dynamic handling condition, and includes an instruction to instruct, if the sensing data that can be handled as dynamic data and is output by the sensor or data that can be handled as dynamic data and is output by another sensor attached to this sensor satisfies the dynamic handling condition, the corresponding sensor to transmit the sensing data to the application.

Appendix 2

A control method comprising:
a first acquiring step of acquiring sensor-side metadata, which is information relating to a sensor that can output sensing data;
a second acquiring step of acquiring application-side metadata, which is information relating to an application that uses the sensing data;
a comparing step of executing matching between the sensor-side metadata and the application-side metadata, and extracting a sensor that can provide sensing data that meets a request of the application; and
an instructing step of transmitting, to a sensor management device that manages the sensor, a data flow control command that includes information that can specify the sensor extracted by the comparison unit, and the application,
    wherein the sensor-side metadata contains information that designates part of the metadata as being able to be handled as dynamic data,
    the application-side metadata contains a condition that part of the metadata is required to be handled as dynamic data, and a dynamic handling condition,
    the data flow control command includes the dynamic handling condition, and includes an instruction to instruct, if the sensing data that can be handled as dynamic data and is output by the sensor or data that can be handled as dynamic data and is output by another sensor attached to this sensor satisfies the dynamic handling condition, the corresponding sensor to transmit the sensing data to the application.

Appendix 3

A sensor management device comprising:
a memory in which a receiving unit configured to receive sensing data output by a sensor, and a transmitting unit capable of transmitting the received sensing data to an application that uses the sensing data are stored; and
    a hardware processor connected to the memory,
    wherein the hardware processor is configured to:
    receive the sensing data output by the sensor;
    transmit the received sensing data to an application that uses the sensing data; and
    receive a data flow control command that includes information that can specify the application and the sensor that is extracted through matching between sensor-side metadata, which is information relating to a sensor that can output the sensing data, and application-side metadata, which is information relating to an application that uses the sensing data, and
    wherein the sensor-side metadata contains information that designates part of the metadata as being able to be handled as dynamic data,
    the application-side metadata contains a condition that part of the metadata is required to be handled as dynamic data, and a dynamic handling condition,
    the data flow control command includes the dynamic handling condition, and
    in the transmitting step, if the sensing data that can be handled as dynamic data and is output by the sensor or data that can be handled as dynamic data and is output by another sensor attached to this sensor satisfies the dynamic handling condition, the sensing data is transmitted to the application.

Appendix 4

A sensor management method comprising:
a receiving step of receiving sensing data output by a sensor; and
a transmitting step capable of transmitting the received sensing data to an application that uses the sensing data, wherein, in the receiving step, a data flow control command is received, the data flow control command including information that can specify the application and the sensor that is extracted through matching between sensor-side metadata, which is information relating to a sensor that can output the sensing data, and application-side metadata, which is information relating to an application that uses the sensing data, the sensor-side metadata contains information that designates part of the metadata as being able to be handled as dynamic data, the application-side metadata contains a condition that part of the metadata is required to be handled as dynamic data, and a dynamic handling condition, the data flow control command includes the dynamic handling condition, and in the transmitting step, if the sensing data that can be handled as dynamic data and is output by the sensor or data that can be handled as dynamic data and is output by another sensor attached to this sensor satisfies the dynamic handling condition, the sensing data is transmitted to the application.

REFERENCE SIGNS LIST

1 Data providing system
2 Control device
20 Communication unit (first acquiring unit, second acquiring unit)
21 Control unit
22 Comparison unit
23 Generation unit
24 Notification unit
25 Sensor-side metadata storage unit
26 Application-side metadata storage unit
27 Contract state management unit
3 Sensor management device
30 Communication unit
31 Determination unit
32 Detection unit
33 Delivery unit
34 Sensing data storage unit
4 Sensor
5 Application server
6 NW
7 Another sensor
8 Mobile object
80 Network adapter

The invention claimed is:

1. A control device comprising a processor configured with a program to perform operations comprising:
operation as a first acquiring unit configured to acquire sensor-side metadata comprising information relating to sensors configured to output sensing data;
operation as a second acquiring unit configured to acquire application-side metadata comprising information relating to an application that uses the sensing data;
operation as a comparison unit configured to execute matching between the sensor-side metadata and the application-side metadata, and extract a sensor that can provide sensing data that meets a request of the application; and
operation as an instruction unit configured to transmit, to a sensor management device that manages the sensor extracted by the comparison unit, a data flow control command comprising information specifying the sensor extracted by the comparison unit, and the application;

wherein the sensor-side metadata comprises information that designates part of the metadata as dynamic data,
the application-side metadata comprises a condition that part of the metadata is required to be dynamic data, and a dynamic handling condition, and
the data flow control command comprises the dynamic handling condition and, in response to the dynamic data output by the sensor extracted by the comparison unit or dynamic data output by another sensor attached to the sensor extracted by the comparison unit satisfying the dynamic handling condition, an instruction for the corresponding sensor to transmit the sensing data to the application.

2. The control device according to claim 1,
wherein the processor is configured with the program to perform operations such that:
operation as the comparison unit comprises executing matching between a static component contained in the sensor-side metadata and the application-side metadata, and extracts the sensor that can provide the sensing data that meets the request of the application; and
operation as the instruction unit comprises transmitting, to the sensor management device, a data flow control command comprising a dynamic component of the sensor-side metadata that can be used to determine whether the sensing data satisfies the dynamic handling condition.

3. The control device according to claim 2,
wherein the processor is configured with the program to perform operations such that operation as the comparison unit comprises extracting a plurality of candidates for the sensor that can provide the sensing data that meets the request of the application, and
the data flow control command comprises an instruction for any of the plurality of candidates to transmit the sensing data that satisfies the handling condition to the application.

4. The control device according to claim 2,
wherein the processor is configured with the program to perform operations such that, in response to the application-side metadata matching a plurality of pieces of sensor-side metadata, operation as the instruction unit comprises transmitting the data flow control command to a plurality of sensor management devices that correspond to the respective plurality of pieces of sensor-side metadata.

5. The control device according to claim 1,
wherein the processor is configured with the program such that operation as the comparison unit comprises extracting a plurality of candidates for the sensor that can provide the sensing data that meets the request of the application, and
the data flow control command comprises an instruction for any of the plurality of candidates to transmit the sensing data that satisfies the handling condition to the application.

6. The control device according to claim 5,
wherein the processor is configured with the program to perform operations such that, in response to the application-side metadata matching a plurality of pieces of sensor-side metadata, operation as the instruction unit comprises transmitting the data flow control command to a plurality of sensor management devices that correspond to the respective plurality of pieces of sensor-side metadata.

7. The control device according to claim 1,
wherein the processor is configured with the program such that, in response to the application-side metadata matching a plurality of pieces of sensor-side metadata, operation as the instruction unit comprises transmitting the data flow control command to a plurality of sensor management devices that correspond to the respective plurality of pieces of sensor-side metadata.

8. The control device according to claim 7,
wherein the processor is configured with the program such that, in response to a sensor managed by one of the plurality of sensor management devices transmitting the sensing data, operation as the instruction unit comprises notifying the remaining at least one of the plurality of sensor management devices of cancellation of the instruction to deliver the sensing data.

9. The control device according to claim 1,
wherein the metadata comprises a measurement item of the sensor that is handled as dynamic data.

10. A sensor management device comprising a processor configured with a program to perform operations comprising:
operation as a receiving unit configured to receive sensing data output by a sensor; and
operation as a transmitting unit configured to transmit the received sensing data to an application that uses the sensing data,
wherein the processor is configured with the program to perform operations such that operation as the receiving unit comprises receiving a data flow control command comprising information specifying the application and the sensor that is extracted through matching between sensor-side metadata comprising information relating to a sensor configured to output the sensing data, and application-side metadata comprising information relating to an application that uses the sensing data,
the sensor-side metadata comprises information that designates part of the metadata dynamic data,
the application-side metadata comprises a condition that part of the metadata is required to be dynamic data, and a dynamic handling condition,
the data flow control command comprises the dynamic handling condition, and
in response to the dynamic data output by the sensor or dynamic data output by another sensor attached to the sensor satisfies the dynamic handling condition, the transmitting unit transmits the sensing data to the application.

11. The sensor management device according to claim 10,
wherein the processor is configured with the program to perform operations such that:
operation as the receiving unit is comprises operation configured to receive sensing data output by a plurality of sensors; and
operation as the transmitting unit comprises transmitting, out of the dynamic data output by the sensors and the dynamic data output by the other sensors, sensing data that satisfies the dynamic handling condition to the application.

12. The sensor management device according to claim 11,
wherein the processor is configured with the program to perform operations:
further comprising operation as a detection unit configured to detect that the sensing data received by the receiving unit satisfies the dynamic handling condition, the sensing data comprising the dynamic data output by the sensor or the dynamic data output by the other sensors; and
such that: in response to the detection unit detecting that the dynamic handling condition is satisfied, operation as the transmitting unit transmits the sensing data that satisfies the dynamic handling condition to the application.

13. The sensor management device according to claim 11,
wherein the processor is configured with the program to perform operations such that, in response to the sensing data satisfying the dynamic handling condition being transmitted to the application, operation as the transmitting unit comprises notifying a control device that transmitted the data flow control command of the transmission of the sensing data.

14. The sensor management device according to claim 10, further comprising,
a storage unit configured to store the sensing data received by the receiving unit comprising the dynamic data output by the sensor or the dynamic data output by the other sensors,
wherein the processor is configured with the program to perform operations such that operation as the transmitting unit comprises transmitting the sensing data that satisfies the dynamic handling condition to the application, with reference to the storage unit.

15. The sensor management device according to claim 14,
wherein the processor is configured with the program to perform operations:
further comprising operation as a detection unit configured to detect that the sensing data received by the receiving unit satisfies the dynamic handling condition, the sensing data comprising the dynamic data output by the sensor or the dynamic data output by the other sensors; and
such that in response to the detection unit detecting that the dynamic handling condition is satisfied, operation as the transmitting unit comprises transmitting the sensing data that satisfies the dynamic handling condition to the application.

16. The sensor management device according to claim 14,
wherein the processor is configured with the program to perform operations such that, in response to the sensing data satisfying the dynamic handling condition being transmitted to the application, operation as the transmitting unit comprises notifying a control device that transmitted the data flow control command of the transmission of the sensing data.

17. The sensor management device according to claim 10,
wherein the processor is configured with the program to perform operations further comprising operation as a detection unit configured to detect that the sensing data received by the receiving unit satisfies the dynamic handling condition, the sensing data comprising the dynamic data output by the sensor or the dynamic data output by the other sensors, and
in response to the detection unit detecting that the dynamic handling condition is satisfied, the processor is configured with the program to perform operations such that operation as the transmitting unit comprises transmitting the sensing data that satisfies the dynamic handling condition to the application.

18. The sensor management device according to claim 17,
wherein the processor is configured with the program to perform operations such that, in response to the sensing data satisfying the dynamic handling condition being transmitted to the application, operation as the transmitting unit comprises notifying a control device that transmitted the data flow control command of the transmission of the sensing data.

19. The sensor management device according to claim 10, wherein the processor is configured with the program to perform operations such that, in response to the sensing data satisfying the dynamic handling condition being transmitted to the application, operation as the transmitting unit comprises notifying a control device that transmitted the data flow control command of the transmission of the sensing data.

20. A control method comprising:
acquiring sensor-side metadata comprising information relating to sensors configured to output sensing data;
acquiring application-side metadata comprising information relating to an application that uses the sensing data;
executing matching between the sensor-side metadata and the application-side metadata, and extracting a sensor that can provide sensing data that meets a request of the application; and
transmitting, to a sensor management device that manages the extracted sensor, a data flow control command comprising information specifying the extracted sensor, and the application, wherein the sensor-side metadata comprises information that designates part of the metadata as dynamic data, the application-side metadata comprises a condition that part of the metadata is required to be dynamic data, and a dynamic handling condition, the data flow control command comprises the dynamic handling condition and, in response to the dynamic data output by the extracted sensor or dynamic data output by another sensor attached to the extracted sensor satisfying the dynamic handling condition, an instruction for the corresponding sensor to transmit the sensing data to the application.

* * * * *